US012681529B2

(12) United States Patent
Jang

(10) Patent No.: US 12,681,529 B2
(45) Date of Patent: Jul. 14, 2026

(54) DISPLAY DEVICE

(71) Applicant: Samsung Display Co., Ltd., Yongin-si (KR)

(72) Inventor: Minsok Jang, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 882 days.

(21) Appl. No.: 17/870,664

(22) Filed: Jul. 21, 2022

(65) Prior Publication Data

US 2023/0052151 A1 Feb. 16, 2023

(30) Foreign Application Priority Data

Aug. 10, 2021 (KR) ........................ 10-2021-0105600

(51) Int. Cl.
*G06F 1/16* (2006.01)
(52) U.S. Cl.
CPC .......... *G06F 1/1616* (2013.01); *G06F 1/1656* (2013.01)
(58) Field of Classification Search
None
See application file for complete search history.

(56) References Cited

U.S. PATENT DOCUMENTS

| | | | |
|---|---|---|---|
| 10,074,824 B2 | 9/2018 | Han et al. | |
| 10,845,862 B2 | 11/2020 | Kim | |
| 11,089,699 B2 | 8/2021 | Park et al. | |
| 2016/0240817 A1* | 8/2016 | Cho | H10K 59/8731 |
| 2017/0363906 A1* | 12/2017 | Yanagisawa | G02F 1/133528 |
| 2018/0175310 A1* | 6/2018 | Lee | B32B 27/283 |
| 2019/0148310 A1* | 5/2019 | Leong | H01L 23/562 257/668 |
| 2019/0367721 A1* | 12/2019 | Ge | C08K 5/005 |
| 2021/0092855 A1 | 3/2021 | Choi | |

FOREIGN PATENT DOCUMENTS

| | | |
|---|---|---|
| KR | 10-2018-0036904 A | 4/2018 |
| KR | 10-2019-0049454 A | 5/2019 |
| KR | 10-2097031 B1 | 4/2020 |
| KR | 10-2021-0034480 A | 3/2021 |

* cited by examiner

*Primary Examiner* — Anthony J Frost
(74) *Attorney, Agent, or Firm* — Womble Bond Dickinson (US) LLP

(57) ABSTRACT

A display device includes: a display module comprising a first non-folding area, a second non-folding area, and a folding area between the first non-folding area and the second non-folding area; and a support module under the display module to support the display module, the support module including: a base layer comprising at least one of a glass fiber, a carbon fiber, or an aramid fiber; and a support layer having an opening overlapping the folding area, wherein the support layer is on at least one of upper or lower portions of the base layer.

20 Claims, 16 Drawing Sheets

DISPLAY DEVICE

CROSS-REFERENCE TO RELATED APPLICATION

This application claims priority to and the benefit of Korean Patent Application No. 10-2021-0105600, filed on Aug. 10, 2021, the contents of which are hereby incorporated by reference in its entirety.

BACKGROUND

1. Field

Aspects of some embodiments of the present disclosure relate to a display device.

2. Description of the Related Art

Various types of display devices that are applied to multimedia devices, such as television sets, mobile phones, tablet computers, navigation units, game units, or the like, are being developed. In recent years, studies on display devices that include a flexible display member and are foldable or rollable are being conducted to improve the user experience.

A support module may be located under a display module to protect the display module in the display device. The support module may generally have relatively high strength to protect the display module, and may also have flexibility to implement a flexible display device. Demand for development of a material and a structure for the support module that satisfies high strength characteristics and flexibility is increasing.

The above information disclosed in this Background section is only for enhancement of understanding of the background and therefore the information discussed in this Background section does not necessarily constitute prior art.

SUMMARY

Aspects of some embodiments of the present disclosure relate to a display device. For example, aspects of some embodiments of the present disclosure relate to a display device including a support module.

Some embodiments according to the present disclosure include a display device having relatively excellent impact resistance and flexibility.

Aspects of some embodiments of the inventive concept include a display device including a display module including a first non-folding area, a folding area, and a second non-folding area, which are sequentially defined, and a support module under the display module to support the display module. The support module includes a base layer including at least one of a glass fiber, a carbon fiber, or an aramid fiber and a support layer provided with an opening defined to overlap the folding area. The support layer is on at least one of upper or lower portions of the base layer.

According to some embodiments, the support layer includes a resin.

According to some embodiments, the resin includes at least one of an acrylic resin, an epoxy resin, or a urethane resin.

According to some embodiments, the support module further includes a plurality of spacers in the opening and spaced apart from each other. The spacers include a first spacer having a first thickness and a second spacer having a second thickness smaller than the first thickness.

According to some embodiments, the first spacer is alternately arranged with the second spacer.

According to some embodiments, the support layer includes a first support layer on the base layer and a second support layer under the base layer.

According to some embodiments, the support module includes a first filling member filled between at least two of the first support layer, the first spacer, and the second spacer.

According to some embodiments, the support module includes a second filling member filled between at least two of the second support layer, the first spacer, and the second spacer.

According to some embodiments, the support module includes a third filling member overlapping the second spacer and on the second spacer, and a sum of a thickness of the third filling member and a thickness of the second spacer is equal to a thickness of the first spacer.

According to some embodiments, the first filling member includes a same material as a material of the second filling member, and the third filling member includes a material different from the material of the first filling member.

According to some embodiments, the first filling member, the second filling member, and the third filling member include a same material as each other.

According to some embodiments, the third filling member includes a thermoplastic polyurethane.

According to some embodiments, the support module further includes an adhesive layer on one surface of the support layer.

According to some embodiments, the first filling member, the second filling member, and the adhesive layer include a same material as each other.

According to some embodiments, the support layer includes a first sub-support portion overlapping the first non-folding area and a second sub-support portion overlapping the second non-folding area.

According to some embodiments, the first sub-support portion includes a lower first sub-support portion under the base layer and an upper first sub-support portion on the base layer, and the second sub-support portion includes a lower second sub-support portion under the base layer and an upper second sub-support portion on the base layer.

According to some embodiments, the support module includes a plurality of spacers under the base layer and between the lower first sub-support portion and the lower second sub-support portion.

According to some embodiments, the support module includes a plurality of spacers on the base layer and between the upper first sub-support portion and the upper second sub-support portion.

According to some embodiments, the support module further includes a filling material at at least one of between the lower first sub-support portion and the lower second sub-support portion or between the upper first sub-support portion and the upper second sub-support portion.

According to some embodiments, the display device may have relatively excellent impact resistance and flexibility.

BRIEF DESCRIPTION OF THE DRAWINGS

The above and other characteristics of embodiments according to the present disclosure will become more readily apparent by reference to the following detailed description when considered in conjunction with the accompanying drawings wherein.

DETAILED DESCRIPTION

Figure 1A:
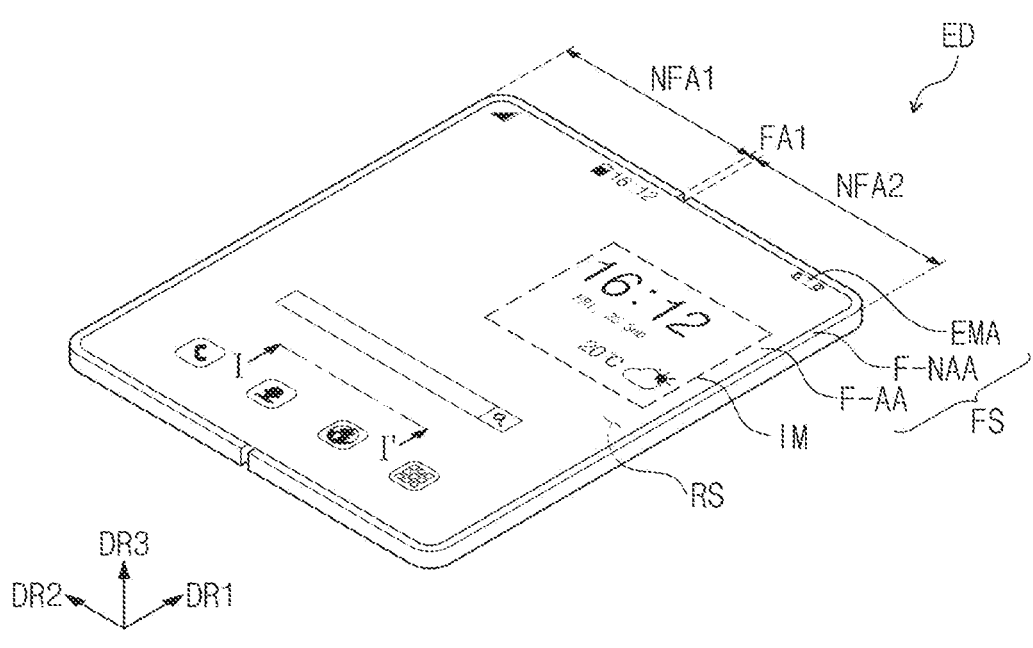
FIG. 1A is a perspective view showing a display device in an unfolded state according to some embodiments of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device will be explained in more detail with reference to the accompanying drawings.

Figure 1B:
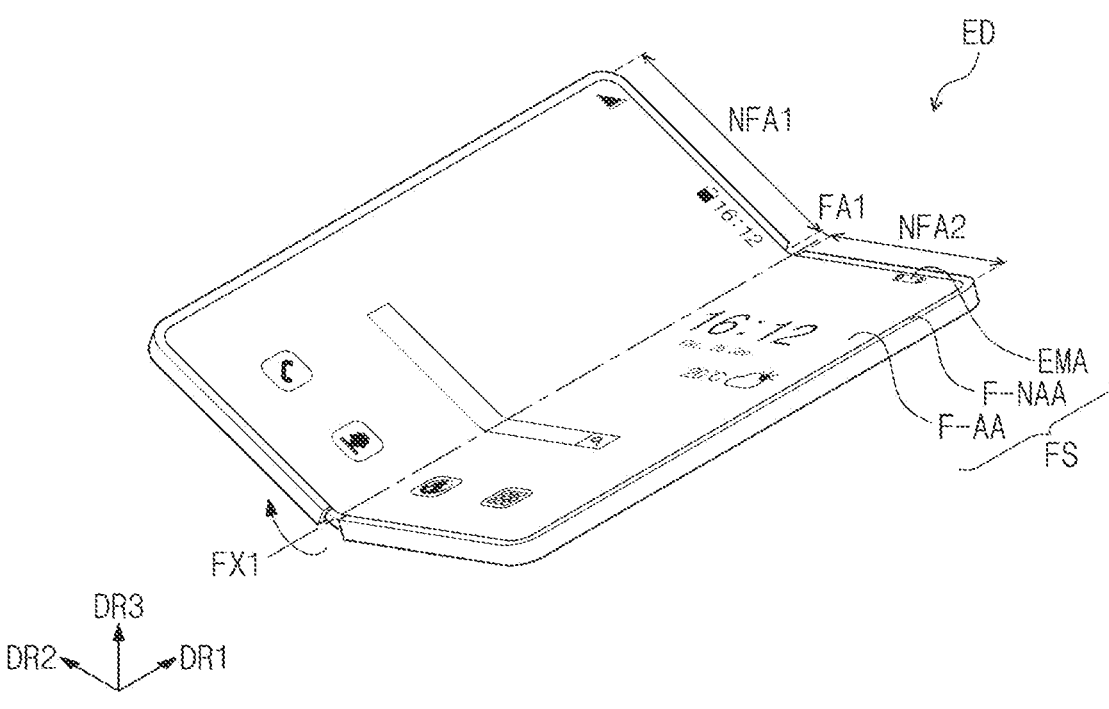
FIG. 1B is a perspective view showing the display device of FIG. 1A which is being inwardly folded according to some embodiments of the present disclosure.
Figure 1C:
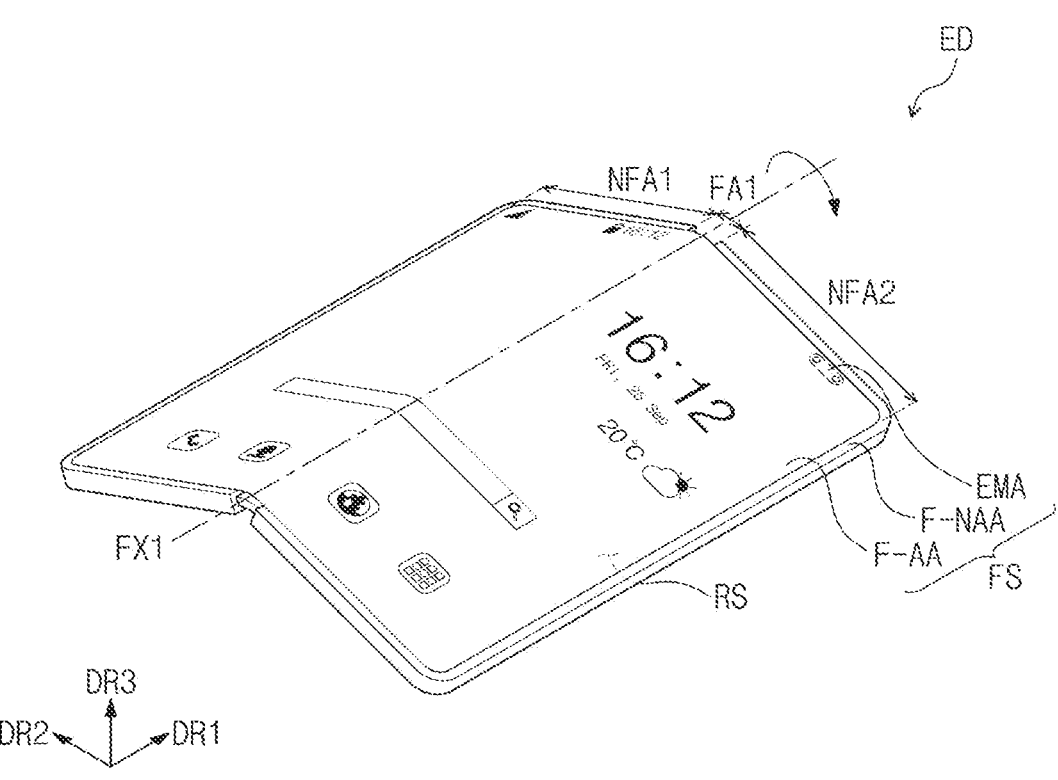
FIG. 1C is a perspective view showing the display device of FIG. 1A which is being outwardly folded according to some embodiments of the present disclosure.

FIG. 1A is a perspective view showing a display device ED in an unfolded state according to some embodiments of the present disclosure. FIG. 1B is a perspective view showing the display device ED of FIG. 1A, which is being inwardly folded according to some embodiments of the present disclosure. FIG. 1C is a perspective view showing the display device ED of FIG. 1A, which is being outwardly folded according to some embodiments of the present disclosure.

Referring to FIGS. 1A to 10, the display device ED may be a device that is activated in response to electrical signals. As an example, the display device ED may be a mobile phone, a tablet computer, a car navigation unit, a game unit, or a wearable device, however, embodiments according to the present disclosure are not limited thereto or thereby. In FIG. 1A and the following drawings, the mobile phone is shown as a representative example of the display device ED.

The display device ED may include a first display surface FS defined by of a first direction DR1 and a second direction DR2 crossing the first direction DR1. The display device ED may display one or more images IM to a user through the first display surface FS. The display device ED may display the image IM through the first display surface FS, which is substantially parallel to each of the first direction DR1 and the second direction DR2, toward a third direction DR3. In the present disclosure, front (or upper) and rear (or lower) surfaces of each member of the display device ED may be defined with respect to a direction in which the image IM is displayed. The front and rear surfaces may be opposite to each other in the third direction DR3, and a normal line direction of each of the front and rear surfaces may be substantially parallel to the third direction DR3.

According to some embodiments, the display device ED may include the first display surface FS and a second display surface RS. The first display surface FS may include a first active area F-AA and a first peripheral area F-NAA. The first active area F-AA may include an electronic module area EMA. The second display surface RS may be opposite to at least a portion of the first display surface FS. That is, the second display surface RS may be defined as a portion of a rear surface of the display device ED.

The display device ED may sense an external input applied thereto from an outside. The external input may include various forms of inputs provided from the outside of the display device ED. For example, the external inputs may include a proximity input (e.g., hovering or placing a finger or stylus over or near the display device ED) applied when approaching close to or adjacent to the display device ED at a distance (e.g., a set or predetermined distance) as well as a touch input by a user's body (e.g., users hand or finger) ora stylus. In addition, the external inputs may be provided in the form of force, pressure, temperature, light, etc.

Meanwhile, FIG. 1A and the following drawings show first, second, and third directions DR1, DR2, and DR3, and directions indicated by the first, second, and third directions DR1, DR2, and DR3 may be relative to each other and may be changed to other directions.

The first display surface FS of the display device ED may include the first active area F-AA and the first peripheral area F-NAA, The first active area F-AA may be activated in response to the electrical signals. The display device ED may display the image IM through or at the first active area F-AA, and various external inputs may be sensed through or at the first active area F-AA. The first peripheral area F-NAA may be defined adjacent to the first active area F-AA. The first peripheral area F-NAA may have a color (e.g., a set or predetermined color), The first peripheral area F-NAA may surround the first active area F-AA. Accordingly, the first active area F-AA may have a shape that is substantially defined by the first peripheral area F-NAA, however, this is merely one example. The first peripheral area F-NAA may be defined adjacent to only one side of the first active area F-AA or may be omitted according to various embodiments. According to various embodiments, the active area of the display device ED may have various shapes, and the shape of the active area is not limited to the shape illustrated in FIGS. 1A-1C.

The display device ED may include a folding area FA1 and non-folding areas NFA1 and NFA2. The display device ED may include a plurality of non-folding areas NFA1 and NFA2. According to some embodiments, the display device ED may include a first non-folding area NFA1 and a second non-folding area NFA2 spaced apart from the first non-folding area NFA1 with the folding area FA1 interposed therebetween, Meanwhile, FIGS. 1A to 10 show the display device ED including one folding area FA1 as a representative example, however, the display device ED should not be limited thereto or thereby. According to some embodiments, the display device ED may include a plurality of folding areas.

Referring to FIG. 1B, the display device ED may be folded (e.g., in-folded) with respect to a first folding axis FX1. The first folding axis FX1 may be an imaginary axis extending in the first direction DR1 to be substantially parallel to a direction in which a long side of the display device ED extends. The first folding axis FX1 may extend in the first direction DR1 on the first display surface FS.

According to some embodiments, the non-folding areas NFA1 and NFA2 may be arranged adjacent to each other with the folding area FA1 interposed therebetween. For example, the first non-folding area NFA1 may be arranged adjacent to one side of the folding area FA1 in the second direction DR2, and the second non-folding area NFA2 may be arranged adjacent to the other side of the folding area FA1 in the second direction DR2.

The display device ED may be folded about the first folding axis FX1 to be in the inwardly folded (in-folding) state where one area of the first display surface FS, which overlaps the first non-folding area NFA1, faces the other area of the first display surface FS, which overlaps the second non-folding area NFA2.

Meanwhile, the second display surface RS may be viewed by the user when the display device ED is in the inwardly folded state. The second display surface RS may further include the electronic module area EMA in which an electronic module including various components is arranged.

Referring to FIG. 1C, the display device ED may be folded about the folding axis FX1 to be in an outwardly folded (out-folding) state where one area of the second display surface RS, which overlaps the first non-folding area NFA1, faces the other area of the second display surface RS, which overlaps the second non-folding area NFA2.

However, the display device ED is not limited thereto or thereby. For example, according to some embodiments, the display device ED may be folded about a plurality of folding axes such that a portion of the first display surface FS and a portion of the second display surface RS may face each other, and the number of the folding axes and the number of non-folding areas is not limited to the number illustrated in FIGS. 1A-1C.

Various electronic modules may be arranged in the electronic module area EMA. For example, the electronic module may include at least one of a camera, a speaker, an optical sensor, or a thermal sensor. An external object may be sensed through the electronic module area EMA of the first display surface FS or the second display surface RS, or a sound signal, such as a voice, may be provided to the outside through the electronic module area EMA of the first display surface FS or the second display surface RS. In addition, the electronic module may include a plurality of components, however, it should not be limited to a particular embodiment.

The electronic module area EMA may be surrounded by the first active area F-AA and the first peripheral area F-NAA, however, it should not be limited thereto or thereby. The electronic module area EMA may be defined in the first active area F-AA, and the electronic module area EMA should not be particularly limited.

Figure 2A:
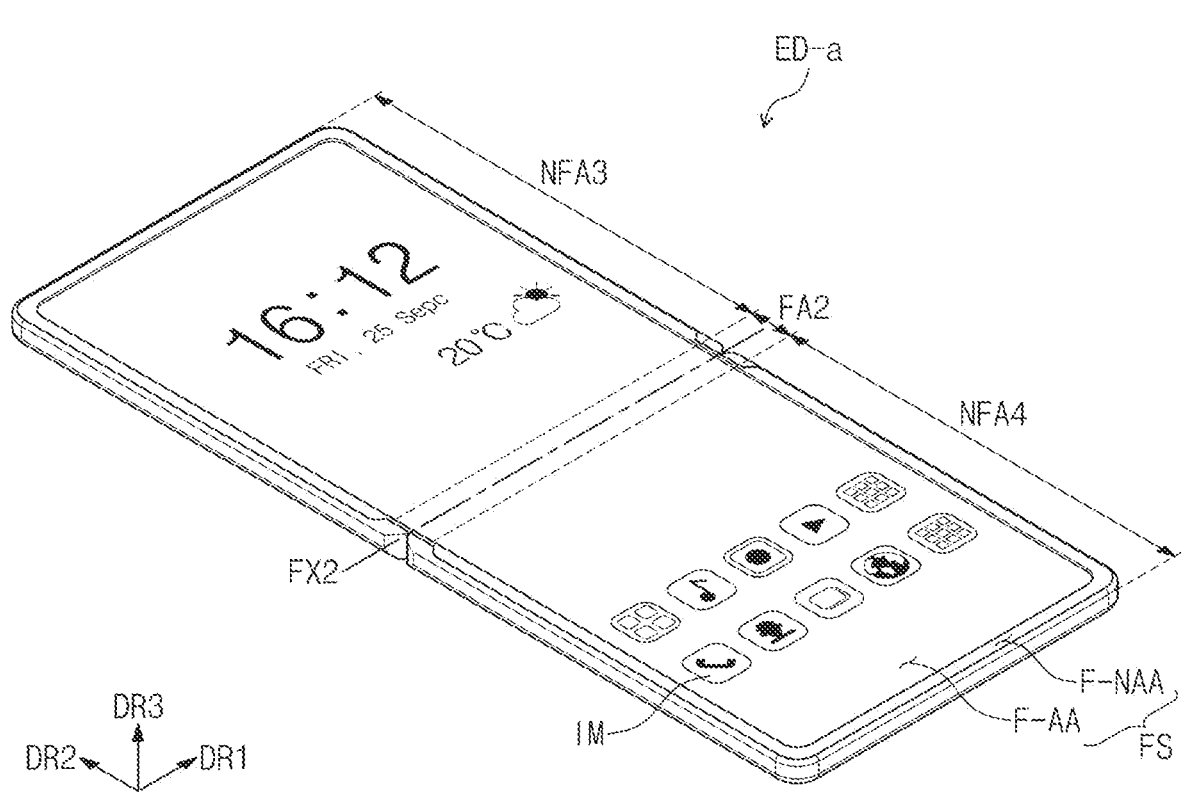
FIG. 2A is a perspective view showing a display device in an unfolded state according to some embodiments of the present disclosure.
Figure 2B:
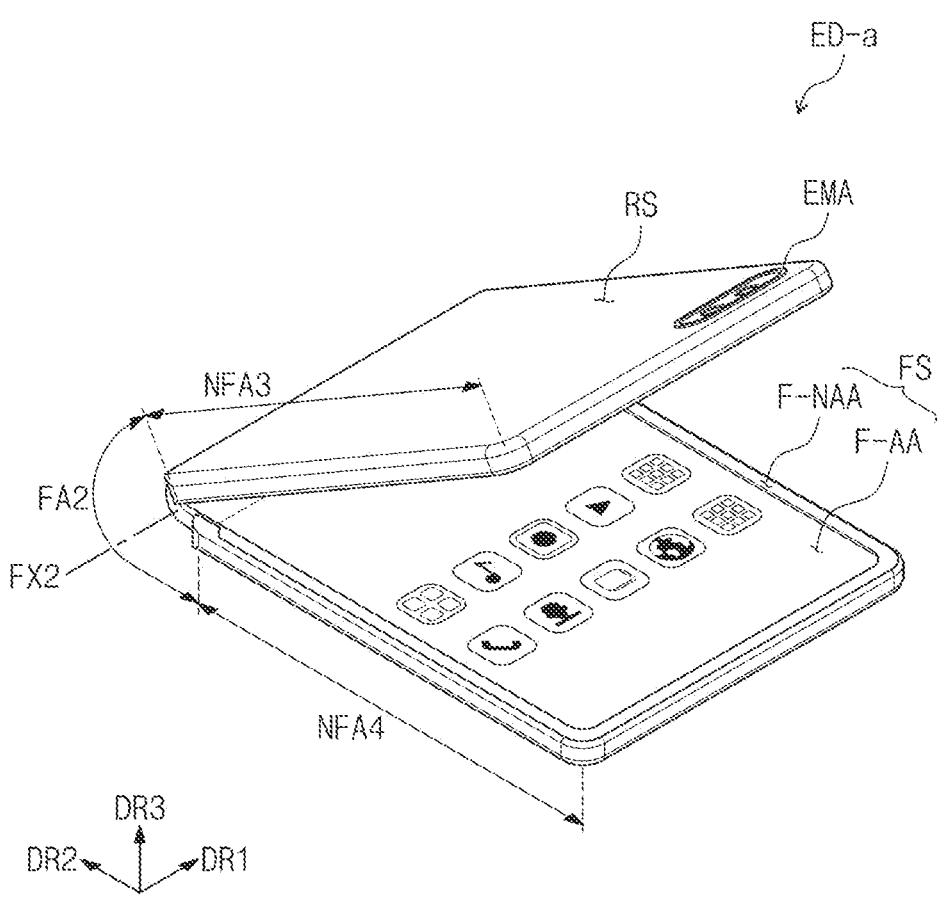
FIG. 2B is a perspective view showing the display device of FIG. 2A which is being inwardly folded according to some embodiments of the present disclosure.

FIG. 2A is a perspective view showing a display device ED-a in an unfolded state according to some embodiments of the present disclosure. FIG. 2B is a perspective view showing the display device ED-a of FIG. 2A which is being inwardly folded according to some embodiments of the present disclosure.

The display device ED-a may be folded with respect to a second folding axis FX2 extending in a direction substantially parallel to the first direction DR1, In FIG. 2B, the second folding axis FX2 extends substantially parallel to a direction in which a short side of the display device ED-a extends, however, it should not be limited thereto or thereby.

According to some embodiments, the display device ED-a may include at least one folding area FA2 and non-folding areas NFA3 and NFA4 defined adjacent to the folding area FA2. The non-folding areas NFA3 and NFA4 may be spaced apart from each other with the folding area FA2 interposed therebetween.

The folding area FA2 may have a curvature (e.g., a set or predetermined curvature) and a radius of curvature (e.g., a set or predetermined radius of curvature). According to some embodiments, the display device ED-a may be inwardly folded (in-folding) such that a first non-folding area NFA3 and a second non-folding area NFA4 may face each other and a first display surface FS may not be exposed to the outside.

In addition, different from the display device ED-a shown in FIGS. 2A and 2B, the display device ED-a may be outwardly folded (out-folding) such that the first display surface FS may be exposed to the outside. Meanwhile, the first display surface FS may be viewed by the user in the unfolded state of the display device ED-a, and a second display surface RS may be viewed by the user in the inwardly folded (in-folding) state. The second display surface RS may include an electronic module area EMA in which an electronic module including various components is arranged.

According to some embodiments, the display device ED-a may include the second display surface RS, and the second display surface RS may be defined as a surface opposite to at least a portion of the first display surface FS. In the inwardly folded (in-folding) state of the display device ED-a, the second display surface RS may be viewed by the user. The second display surface RS may include the electronic module area EMA in which the electronic module including various components is arranged. Meanwhile, according to some embodiments, the image may be displayed through or at the second display surface RS.

The display devices ED and ED-a may be configured to repeat the unfolding operation and the in-folding operation or to repeat the unfolding operation and the out-folding operation, however, embodiments according to the present disclosure should not be limited thereto or thereby. According to some embodiments, the display devices ED and ED-a may be selectively operated in any one of the unfolding operation, the in-folding operation, and the out-folding operation.

Figure 3:
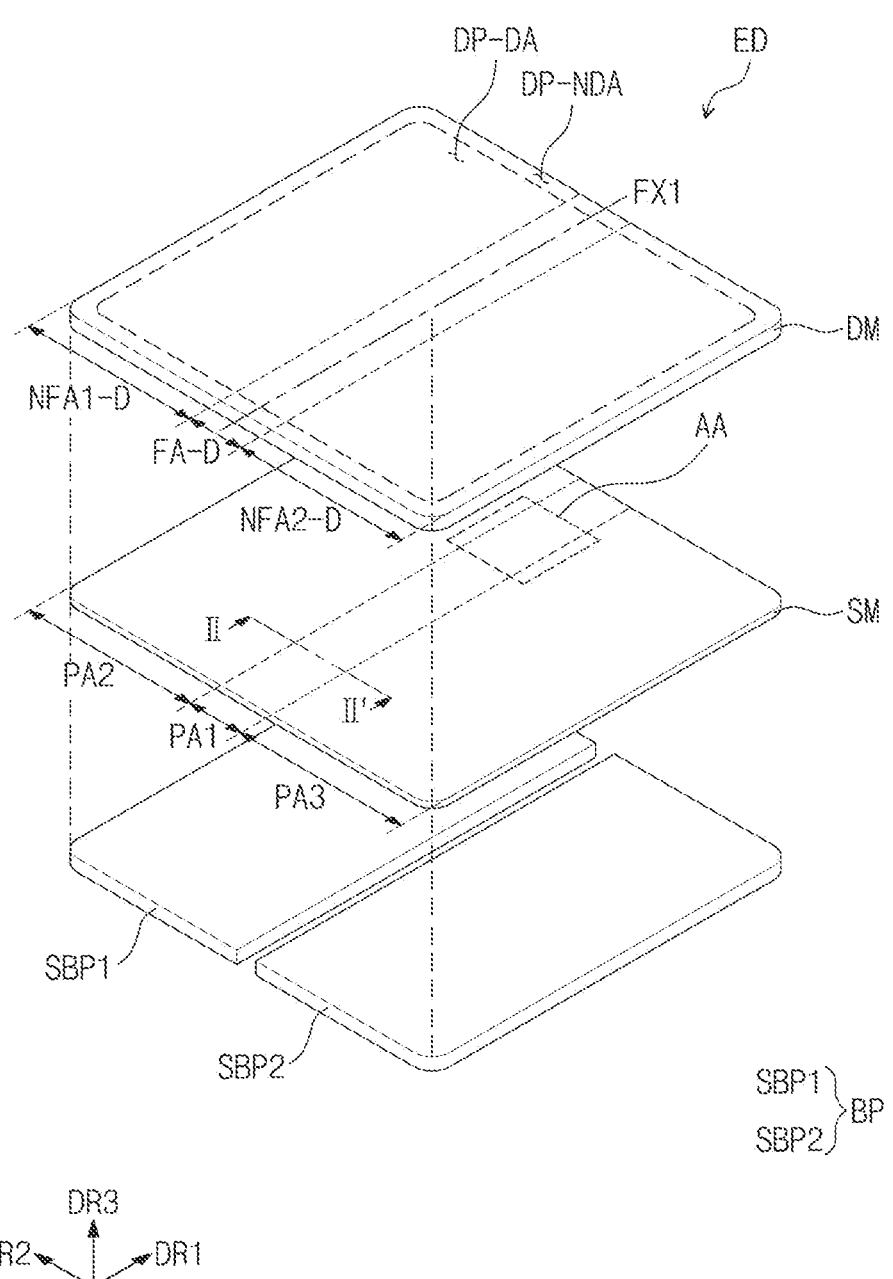
FIG. 3 is an exploded perspective view showing a display device according to some embodiments of the present disclosure.
Figure 4:
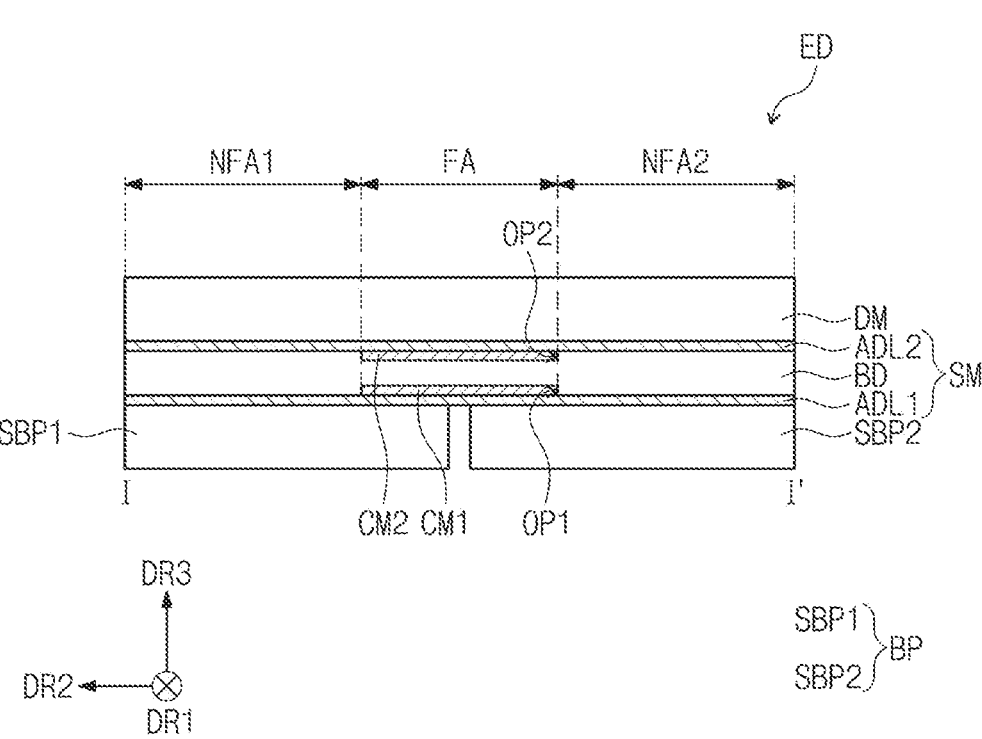
FIG. 4 is a cross-sectional view showing a display device according to some embodiments of the present disclosure.

FIG. 3 is an exploded perspective view showing the display device ED according to some embodiments of the present disclosure, FIG. 4 is a cross-sectional view showing the display device ED according to some embodiments of the present disclosure. FIG. 3 shows the exploded perspective view of the display device shown in FIG. 1A. FIG. 4 shows the cross-sectional view taken along a line I-I' of FIG. 1A.

Referring to FIGS. 3 and 4, the display device ED may include a display module DM and a support module SM arranged under the display module DM. In addition, the display device ED may further include a base substrate BP arranged under the support module SM.

The display module DM of the display device ED may display the image in response to the electrical signals and may transmit/receive information about the external input. The display module DM may include a display area DP-DA and a non-display area DP-NDA. The non-display area DP-NDA may be defined adjacent to the display area DP-DA. For example, the non-display area DP-NDA may surround the display area DP-DA, however, this is merely one example. The non-display area DP-NDA may be defined in various shapes and should not be particularly limited. According to some embodiments, the display area DP-DA of the display module DM may correspond to at least a portion of the first active area F-AA (refer to FIG. 1A).

According to some embodiments, the display module DM may include a display panel and an input sensor arranged on the display panel. The display panel may include a display element layer. For instance, the display element layer may include an organic electroluminescent element, a quantum dot light emitting element, or a liquid crystal element, however, embodiments according to the present disclosure are not limited thereto or thereby.

The display module DM may further include an optical layer arranged on the input sensor. The optical layer may reduce a reflection of an external light. As an example, the optical layer may include a polarizing layer or a color filter layer.

The display module DM of the display device ED may include a folding display portion FA-D and non-folding display portions NFA1-D and NFA2-D. The folding display portion FA-D may correspond to the folding area FA1 (refer to FIG. 1A), and the non-folding display portions NFA1-D and NFA2-D may correspond to the non-folding areas NFA1 and NFA2 (refer to FIG. 1A).

The folding display portion FA-D may be folded or bent with respect to the first folding axis FX1. The display module DM may include a first non-folding display portion NFA1-D and a second non-folding display portion NFA2-D, and the first non-folding display portion NFA1-D and the second non-folding display portion NFA2-D may be spaced apart from each other with the folding display portion FA-D interposed therebetween.

The support module SM may be located under the display module DM. The support module SM may support the display module DM.

The support module SM of the display device ED may include a first portion PA1, a second portion PA2, and a third portion PA3. The first portion PA1 may correspond to the folding area FA1 (refer to FIG. 3), the second portion PA2 may correspond to the first non-folding area NFA1, and the third portion PA3 may correspond to the second non-folding area NFA2.

Referring to FIG. 4, the support module SM may include a body portion BD and adhesive layers ADL2 and ADL1 respectively located on and under the body portion BD.

The body portion BD may be provided with openings OP1 and OP2 defined therein to overlap the first portion PA1. That is, the openings OP1 and OP2 may overlap the folding area FA1 (refer to FIG. 1A).

In addition, the openings OP2 and OP1 may be respectively defined in upper and lower portions of the body portion BD. The openings OP1 and OP2 may not penetrate through the body portion BD. The body portion BD will be described in more detail with reference to FIG. 5.

As the openings OP1 and OP2 are defined in the body portion BD, a flexibility of the body portion BD may be improved, and a folding operation of the display device ED may be easily performed. Meanwhile, FIG. 4 shows a structure in which a first opening OP1 and a second opening OP2 have the same width as each other, however, it should not be limited thereto or thereby. According to some embodiments, the first opening OP1 and the second opening OP2 may have different widths from each other.

According to some embodiments, a filling material may be filled in the first opening OP1 and the second opening OP2. As an example, a first filling member CM1 may be arranged in the first opening OP1, and a second filling member CM2 may be arranged in the second opening OP2.

According to some embodiments, a first adhesive layer ADL1 may be arranged under the body portion BD and the first filling member CM1. The first adhesive layer ADL1 may attach the body portion BD to the base substrate BP.

A second adhesive layer ADL2 may be arranged on the body portion BD and the second filling member CM2. The second adhesive layer ADL2 may attach the display module DM to the body portion BD.

In addition, the first adhesive layer ADL1 may provide a lower surface of the support module SM. For example, the first adhesive layer ADL1 may provide a flat lower surface of the support module SM. The second adhesive layer ADL2 may provide an upper surface of the support module SM. For example, the second adhesive layer ADL2 may provide a flat upper surface of the support module SM. FIG. 4 shows a structure in which the first adhesive layer ADL1 has the same thickness as that of the second adhesive layer ADL2, however, embodiments according to the present disclosure are not limited thereto or thereby. According to some embodiments, the first adhesive layer ADL1 and the second adhesive layer ADL2 may have different thicknesses from each other.

However, embodiments according to the present disclosure are not limited thereto or thereby. The display module DM arranged on the support module SM and the base substrate BP arranged under the support module SM may be arranged directly on the support module SM without the adhesive layers ADL1 and ADL2.

The base substrate BP may be arranged under the support module SM. The base substrate BP may support the support module SM. The base substrate BP may include a first sub-base substrate SBP1 and a second sub-base substrate SBP2.

The first sub-base substrate SBP1 and the second sub-base substrate SBP2 may be spaced apart from each other in the second direction DR2. The first sub-base substrate SBP1 may overlap the folding area FA1 and the first non-folding area NFA1, and the second sub-base substrate SBP2 may overlap the folding area FA1 and the second non-folding area NFA2.

According to some embodiments, the base substrate BP may include a cushion layer that absorbs an external impact applied thereto to protect components arranged on or under the base substrate BP from the external impact. The cushion layer may prevent the support member SM from being pressed and plastic-deformed by external impact and force. The cushion layer may include a sponge, a foam, or an elastomer such as a urethane resin. In addition, the cushion layer may include at least one of an acrylic-based polymer, a urethane-based polymer, a silicon-based polymer, or an imide-based polymer, however, the cushion layer should not be limited thereto or thereby.

Figure 5:
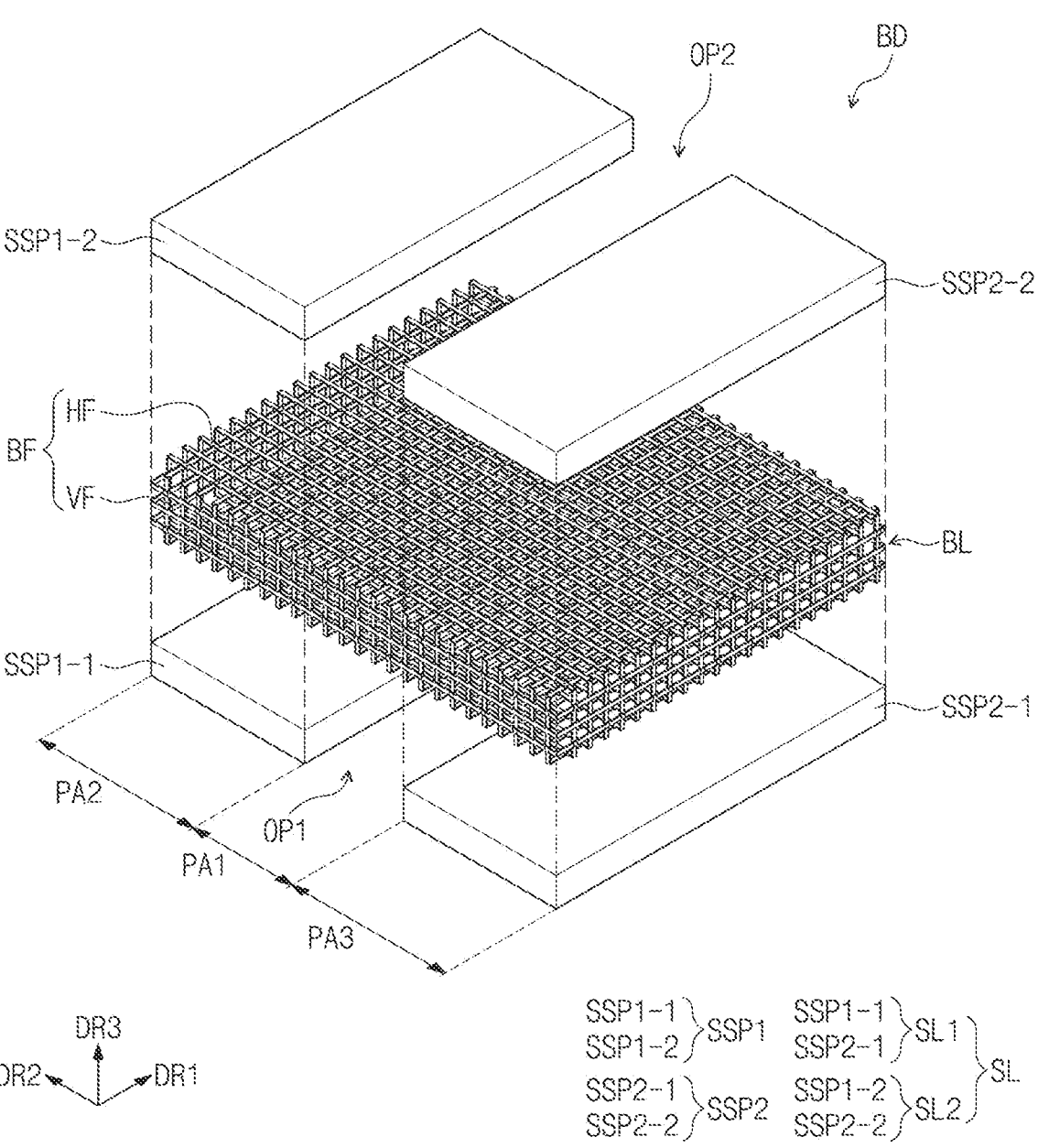
FIG. 5 is an exploded perspective view showing a body portion according to some embodiments of the present disclosure.
Figure 6:
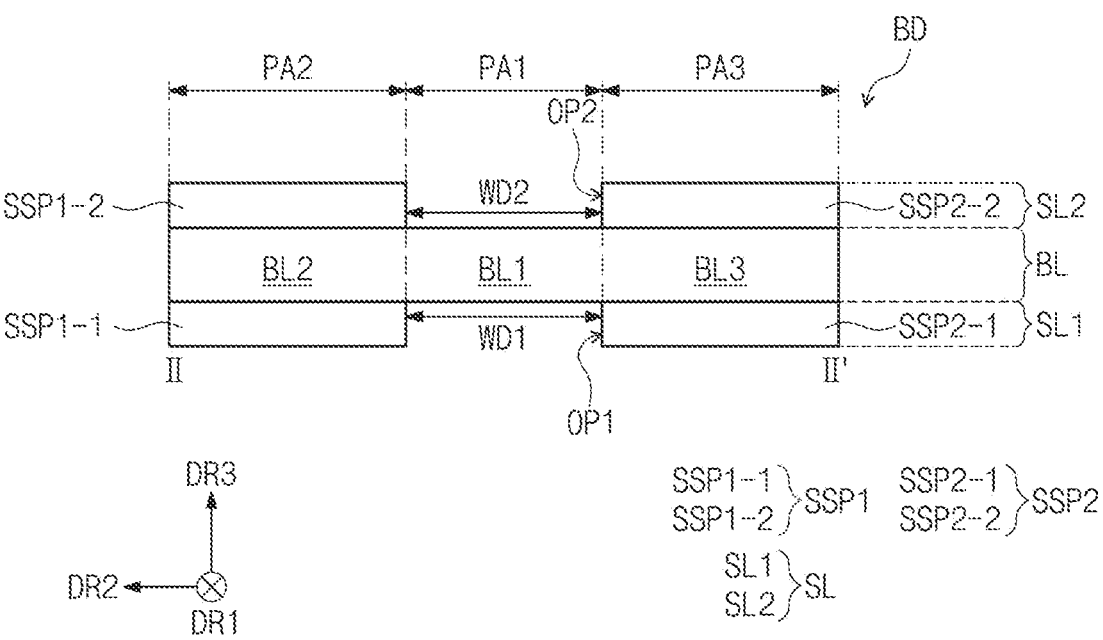
FIG. 6 is a cross-sectional view showing a body portion according to some embodiments of the present disclosure.

FIG. 5 is an exploded perspective view showing the body portion BD according to some embodiments, and FIG. 6 is a cross-sectional view showing the body portion BD according to some embodiments. FIG. 5 shows the exploded perspective view of the body portion BD shown in FIG. 4. FIG. 6 shows the cross-sectional view showing only the body portion BD and taken along a line of FIG. 3.

Referring to FIGS. 5 and 6, the body portion BP may include a base layer BL and a support layer SL arranged on upper and lower portions of the base layer BL.

The support layer SL may overlap the second portion PA2 and the third portion PA3. That is, the base layer BL may be covered by the support layer SL in areas corresponding to the second portion PA2 and the third portion PA3 and may be exposed in an area corresponding to the first portion PA1 without being covered by the support layer SL.

The base layer BL may include a base fiber BF. The base fiber BF may include a glass fiber, a carbon fiber, or an aramid fiber, however, it should not be particularly limited, and the base fiber BF may include any suitable fiber material.

The support layer SL may include a first sub-support portion SSP1 arranged to overlap the second portion PA2 and a second sub-support portion SSP2 arranged to overlap the third portion PA3. The first sub-support portion SSP1 and the second sub-support portion SSP2 may be arranged to be spaced apart from each other n the second direction DR2.

The first sub-support portion SSP1 and the second sub-support portion SSP2 may include a support portion resin. The support portion resin may have a modulus equal to or greater than about $10^3$ Mpa and equal to or smaller than about $10^4$ Mpa at a temperature of about −20° C. When the modulus of the support portion resin is smaller than about $10^3$ Mpa, an impact resistance of the support layer SL may be reduced, and when the modulus of the support portion resin is greater than about $10^4$ Mpa, a flexibility of the support portion resin may be deteriorated.

The support portion resin may include at least one of an acrylic resin, an epoxy resin, or a urethane resin. As an example, the support portion resin may include at least one of the acrylic resin, the epoxy resin, or the urethane resin, may include two resins selected from among the acrylic resin, the epoxy resin, and the urethane resin, or may include each of the acrylic resin, the epoxy resin, and the urethane resin.

According to some embodiments, the first sub-support portion SSP1 and the second sub-support portion SSP2 may include substantially the same support portion resin, however, they should not be limited thereto or thereby. The first sub-support portion SSP1 and the second sub-support portion SSP2 may include different support portion resins from each other.

The first sub-support portion SSP1 may include a lower first sub-support portion SSP1-1 arranged under the base layer BL and an upper first sub-support portion SSP1-2 arranged on the base layer BL.

The second sub-support portion SSP2 may include a lower second sub-support portion SSP2-1 arranged under the base layer BL and an upper second sub-support portion SSP2-2 arranged on the base layer BL.

That is, the lower first sub-support portion SSP1-1 and the lower second sub-support portion SSP2-1 may be arranged under the base layer BL. The lower first sub-support portion SSP1-1 may overlap the second portion PA2 and the lower second sub-support portion SSP2-1 may overlap the third portion PA3. That is, the lower first sub-support portion SSP1-1 and the lower second sub-support portion SSP2-1 may be spaced apart from each other.

The upper first sub-support portion SSP1-2 and the upper second sub-support portion SSP2-2 may be arranged on the base layer BL and may be spaced apart from each other. The upper first sub-support portion SSP1-2 may overlap the second portion PA2, and the upper second sub-support portion SSP2-2 may overlap the third portion PA3. That is, the upper first sub-support portion SSP1-2 and the upper second sub-support portion SSP2-2 may be spaced apart from each other.

The lower first sub-support portion SSP1-1 and the lower second sub-support portion SSP2-1 may be defined as a first support layer SL1. The upper first sub-support portion SSP1-2 and the upper second sub-support portion SSP2-2 may be defined as a second support layer SL2.

That is, the body portion BD may include the first support layer SL1 the base layer BL, and the second support layer SL2, which are sequentially stacked in the third direction DR3.

According to some embodiments, the first opening OP1 may be defined in the first support layer SL1 to overlap the first portion PA1 The first opening OP1 may be defined to penetrate the first support layer SL1, and thus, the lower first sub-support portion SSP1-1 and the lower second sub-support portion SSP2-1 may be spaced apart from each other by the first opening OP1.

According to some embodiments, the second opening OP2 may be defined in the second support layer SL2 to overlap the first portion PA1. The second opening OP2 may be defined to penetrate the second support layer SL2, and thus, the upper first sub-support portion SSP1-2 and the upper second sub-support portion SSP2-2 may be spaced apart from each other by the second opening OP2.

Referring to FIG. 6, the second opening OP2 may overlap the first opening OP1. As an example, a width WD1 of the first opening OP1 may be the same as a width WD2 of the second opening OP2, however, the present disclosure should not be limited thereto to thereby. As an example, the width WD1 of the first opening OP1 and the width WD2 of the second opening OP2 may be different from each other. In the present disclosure, the width of the opening may have a value obtained by measuring a length of the opening in the second direction DR2.

In FIG. 6, each of the first opening OP1 and the second opening OP2 has an angled shape, however, it should not be limited thereto or thereby. As an example, the first opening OP1 and the second opening OP2 may be defined to include a curved portion.

As shown in FIG. 6, the base layer BL may include a first sub-base layer BL1 a second sub-base layer BL2, and a third sub-base layer BL3. The first sub-base layer BL1, the second sub-base layer BL2, and the third sub-base layer BL3 may respectively overlap the first portion PA1, the second portion PA2, and the third portion PA3 when viewed in a plane.

That is, the first sub-base layer BL1, the second sub-base layer BL2, and the third sub-base layer BL3 may correspond to the folding area FA1 (refer to FIG. 1A), the first non-folding area NFA1 (refer to FIG. 1A), and the second non-folding area NFA2 (refer to FIG. 1A), respectively.

Each of the first sub-base layer BL1, the second sub-base layer BL2, and the third sub-base layer BL3 may include the base fiber BF That is, each of the first sub-base layer BL1, the second sub-base layer BL2, and the third sub-base layer BL3 may include a glass fiber, a carbon fiber, or an aramid fiber, however, the present disclosure should not be limited thereto or thereby.

The first sub-base layer BL1, the second sub-base layer BL2, and the third sub-base layer BL3 may include the same material as each other, or at least two sub-base layers of the first sub-base layer BL1, the second sub-base layer BL2, and the third sub-base layer BL3 may include different materials from each other.

As an example, the second sub-base layer BL2 and the third sub-base layer BL3 may include the same material as each other, and the first sub-base layer BL1 may include a material different from that of the second sub-base layer BL2.

As an example, the first sub-base layer BL1 the second sub-base layer BL2, and the third sub-base layer BL3 may include different materials from each other.

As an example, the first sub-base layer BL1, the second sub-base layer BL2, and the third sub-base layer BL3 may include the same material as each other.

As an example, FIG. 6 shows a structure in which the first sub-base layer BL1, the second sub-base layer BL2, and the third sub-base layer BL3 include the same material and are provided integrally with each other, however, the present disclosure should not be limited thereto to thereby.

Hereinafter, the first, second, and third sub-base layers BL1, BL2, and BL3 will be described as including the same material and being provided integrally with each other.

Figure 7:
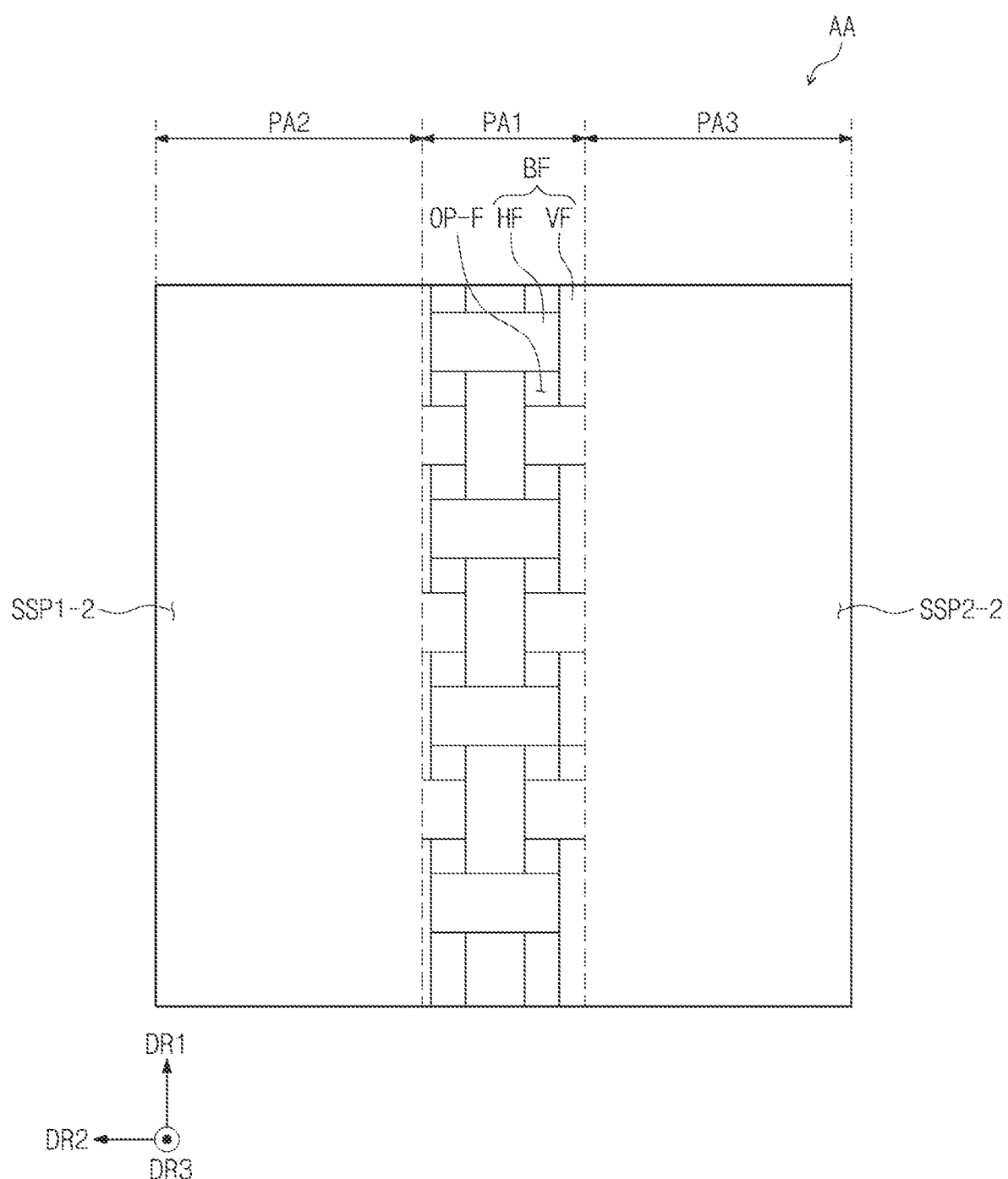
FIG. 7 is an enlarged plan view showing a portion of a body portion according to some embodiments of the present disclosure.

FIG. 7 is an enlarged plan view showing an area AA according to some embodiments of the present disclosure. For the convenience of explanation, FIG. 7 shows only the body portion BD of the support module SM in the area AA of FIG. 3.

Referring to FIG. 7, the base fiber BF may include a plurality of vertical fibers VF extending in the first direction DR1 and a plurality of horizontal fibers HF extending in the second direction DR2. The vertical fibers VF may cross the horizontal fibers HF. The vertical fibers VF may be inter-laced with the horizontal fibers HF and may extend in the first direction DR1, and the horizontal fibers HF may be interlaced with the vertical fibers VF and may extend in the second direction DR2.

FIG. 5 shows a structure in which the vertical fibers VF and the horizontal fibers HF of the base layer BL are formed in a single layer, however, the present disclosure should not be limited thereto or thereby. As an example, the base layer BL may include a plurality of layers formed by the vertical fibers VF and the horizontal fibers HF.

In addition, the vertical fibers VF and the horizontal fibers BF shown in FIGS. 5 and 7 may have the same thickness, however, the present disclosure should not be limited thereto or thereby. As an example, the thickness of the vertical fibers VF may be different from the thickness of the horizontal fibers BF.

The base fiber BF included in the base layer BL may be exposed to the outside of the body portion BD in the first portion PA1, The base layer BL may not be viewed in the second portion PA2 and the third portion PA3 by the upper first sub-support portion SSP1-2 and the upper second sub-support portion SSP2-2.

The base fiber BF may be provided with a fiber opening OP-F defined between the vertical fibers VF adjacent to each other and the horizontal fibers HF adjacent to each other. According to some embodiments, the fiber opening OP-F may have a square shape, however, the shape of the fiber opening OP-F should not be limited to the square shape. As an example, the fiber opening OP-F may have a rectangular shape, a polygonal shape, a circular shape, an oval shape, or any other suitable shape.

In addition, the base layer BL may have a structure in which a fiber resin is not filled in the fiber opening OP-F, however, embodiments according to the present disclosure are not limited thereto or thereby. As an example, the fiber resin may be filled in the fiber opening OP-F, and the fiber resin may be the same resin as the support portion resin. As an example, the fiber resin may include at least one of an acrylic resin, an epoxy resin, or a urethane resin.

FIGS. 5 and 7 show the base fiber BF in a woven form, however, the base fiber BF should not be limited thereto or thereby. As an example, the base fiber BF may have a structure in which fibers extending in one direction are dispersed and arranged in a resin matrix. The fibers extending in one direction may have a width smaller than a width in the one direction of the first and second sub-support portions SSP1 and SSP2. The resin matrix may include a polyimide-based resin or a polypropylene-based resin.

Figure 8:
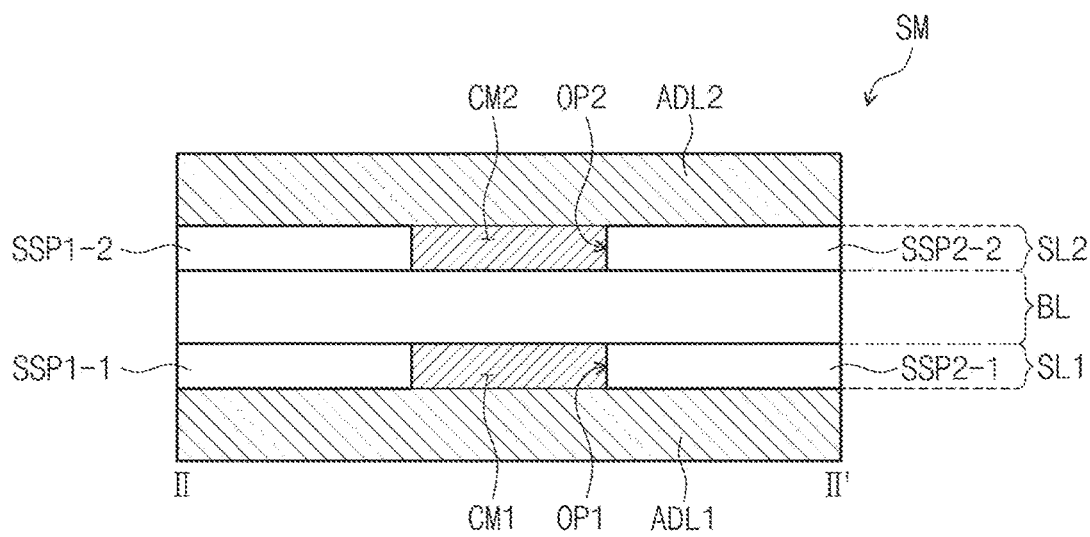
FIG. 8 is a cross-sectional view showing a support module according to some embodiments of the present disclosure.
Figure 8:
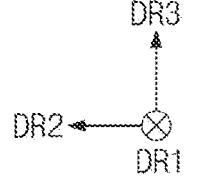

FIG. 8 is a cross-sectional view showing the support module SM according to some embodiments of the present disclosure. FIG. 8 is a cross-sectional view taken along a line H-H' of FIG. 3.

Referring to FIG. 8, the support module SM may further include the filling members CM1 and CM2 arranged in the folding area FA1 (refer to FIG. 1A) between the first sub-support portion SSP1 and the second sub-support portion SSP2. The filling members CM1 and CM2 may be filled in the openings OP1 and OP2. The filling members CM1 and CM2 may include the first filling member CM1 and the second filling member CM2. The first filling member CM1 may be filled in the first opening OP1, and the second filling member CM2 may be filled in the second opening OP2. The support layer SL may further include the filling members CM1 and CM2 respectively filled in the openings OP1 and OP2.

In FIG. 8, each of the filling members CM1 and CM2 has a single-layer structure, however, the present disclosure should not be limited thereto or thereby. Each of the filling members CM1 and CM2 may include multiple layers. As an example, each of the first filling member CM1 and the second filling member CM2 may include the multiple layers, or one of the first filling member CM1 and the second filling member CM2 may include the multiple layers. In the case where each of the filling members CM1 and CM2 includes the multiple layers, the multiple layers may include the same material, or at least one of the layers may include a material different from that of the others.

In addition, FIG. 8 shows a structure in which the filling members CM1 and CM2 are arranged in the first opening OP1 and the second opening OP2, respectively, however, the present disclosure should not be limited thereto or thereby. As an example, according to some embodiments, only the first opening OP1 may be filled with the first filling member CM1, and the second opening OP2 may not be filled with the second filling member CM2. According to some embodiments, only the second opening OP2 may be filled with the second filling member CM2, and the first opening OP1 may not be filled with the first filling member CM1.

The filling members CM1 and CM2 may have a modulus smaller than that of the support portion resin. As an example, the filling members CM1 and CM2 may include at least one of silicone, acrylate, or urethane as its filling material. The filling members CM1 and CM2 and the support portion resin may contain materials of the same kind. In the case where the filling members CM1 and CM2 and the support portion resin contain the materials of the same kind, a resin used to form the filling members CM1 and CM2 may have a chemical structure different from that of the support portion resin, and thus may have different physical properties from those of the support portion resin. According to the display device, because the support module SM includes the filling members CM1 and CM2 arranged in the folding area FA1 (refer to FIG. 1A) and having the modulus smaller than that of the support portion resin, a repulsive force generated during the folding operation of the display device may be reduced, and thus, the flexibility of the display device may be improved.

Referring to FIG. 8, the support module SM may further include the first adhesive layer ADL1 arranged under the first support layer SL1 and the second adhesive layer ADL2 arranged on the second support layer SL2. The first and second adhesive layers ADL1 and ADL2 may be respectively arranged at a lowermost position and an uppermost position of the support module SM to planarize the upper and lower portions of the support module SM.

In FIG. 8, the first adhesive layer ADL1 and the second adhesive layer ADL2 have substantially the same thickness, however, the present disclosure should not be limited thereto or thereby, According to some embodiments, the first adhesive layer ADL1 and the second adhesive layer ADL2 may have different thicknesses from each other.

In FIG. 8, each of the adhesive layers ADL1 and ADL2 has a single-layer structure, however, the present disclosure should not be limited thereto or thereby. According to some embodiments, each of the adhesive layers ADL1 and ADL2 may include multiple layers. As an example, each of the first adhesive layer ADL1 and the second adhesive layer ADL2 may include the multiple layers, or one of the first adhesive layer ADL1 and the second adhesive layer ADL2 may include the multiple layers. In the case where both the adhesive layers ADL1 and ADL2 include the multiple layers, the multiple layers may include the same material, or at least one of the multiple layers may include a material different from the other.

The adhesive layers ADL1 and ADL2 may include at least one of silicone, acrylate, or urethane. The adhesive layers ADL1 and ADL2 may include the same material as that of the filling members CM1 and CM2, however, the present disclosure should not be limited thereto or thereby. According to some embodiments, the adhesive layers ADL1 and ADL2 may include a material different from that of the filling members CM1 and CM2.

The adhesive layers ADL1 and ADL2 may be integrally formed with the filling members CM1 and CM2. That is, the first adhesive layer ADL1 may be integrally formed with the first filling member CM1, and the second adhesive layer ADL2 may be integrally formed with the second filling member CM2. As an example, the first adhesive layer ADL1 and the first filling member CM1 may be formed of the same material through the same single process, and the second adhesive layer ADL2 and the second filling member CM2 may be formed of the same material through the same single process, however, the present disclosure should not be limited thereto or thereby. As an example, the adhesive layers ADL1 and ADL2 may be formed separately from the filling members CM1 and CM2. That is, the adhesive layers ADL1 and ADL2 and the filling members CM1 and CM2 may be formed of the same material through different processes or the adhesive layers ADL1 and ADL2 and the filling members CM1 and CM2 may be formed of different materials from each other through different processes.

The display device ED may include the adhesive layers ADL1 and ADL2 and the filling members CM1 and CM2, and thus, the impact resistance and the durability of the display device may be improved.

Figure 9:
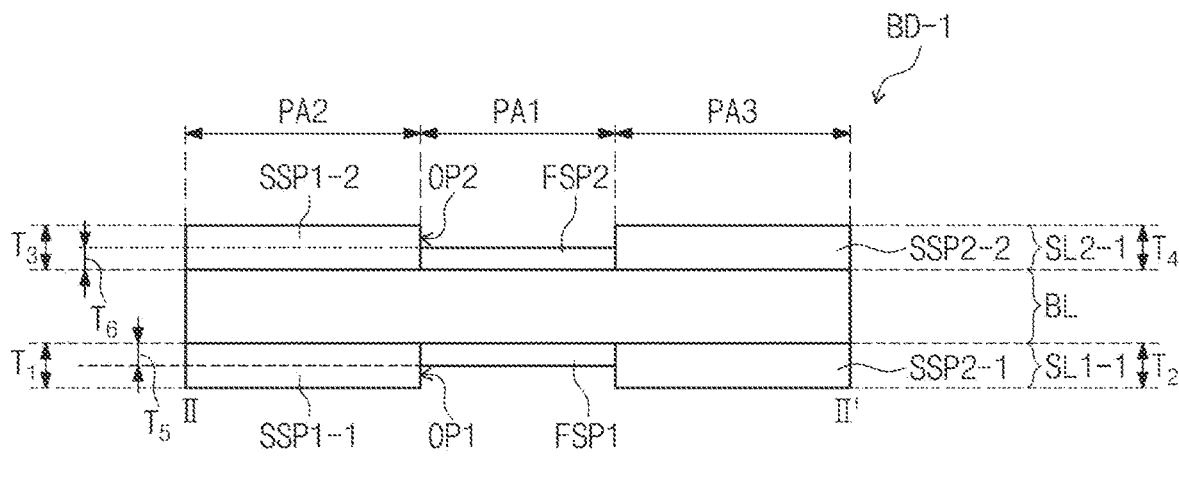
FIG. 9 is a cross-sectional view showing a body portion according to some embodiments of the present disclosure.
Figure 10:
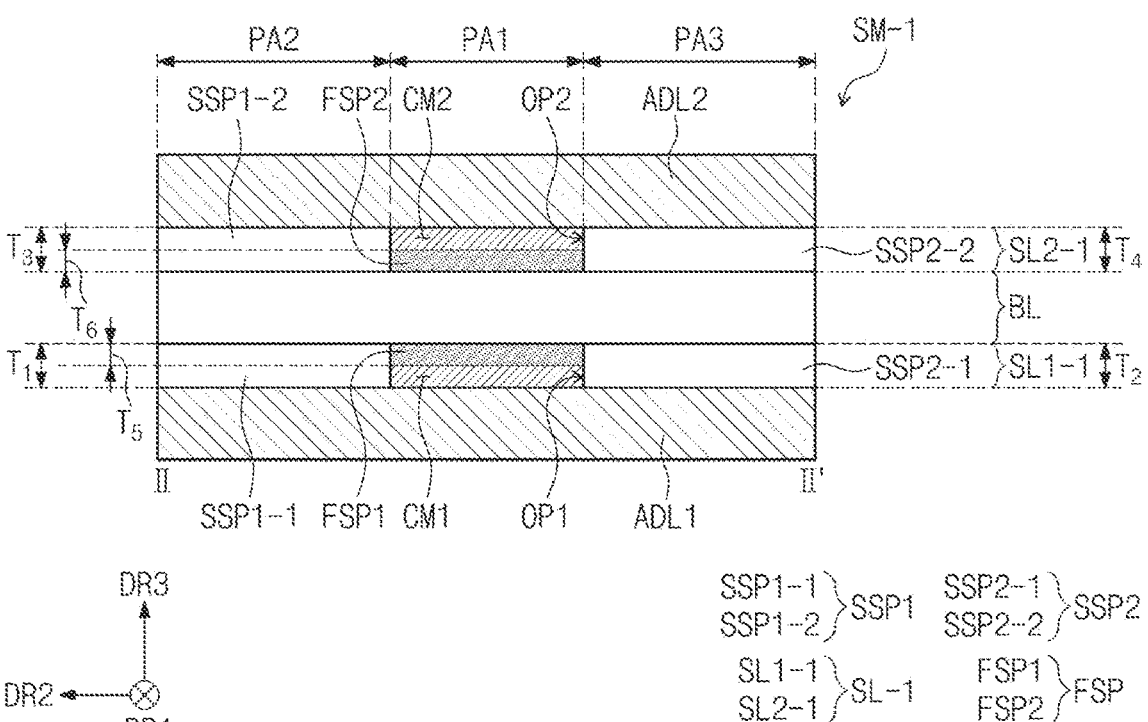
FIG. 10 is a cross-sectional view showing a support module according to some embodiments of the present disclosure.

FIG. 9 is a cross-sectional view showing a body portion BD-1 according to some embodiments of the present disclosure. FIG. 10 is a cross-sectional view showing a support module SM-1 according to some embodiments of the present disclosure. FIGS. 9 and 10 are cross-sectional views taken along a line of FIG. 3. In FIGS. 9 and 10, the same reference numerals denote the same elements in FIGS. 1A to 7, and thus, some detailed descriptions of the same elements may be omitted.

Referring to FIG. 9, the body portion BD-1 may further include folding support portions FSP1 and FSP2 arranged between a first sub-support portion SSP1 and a second sub-support portion SSP2. For example, a lower folding support portion FSP1 may be arranged between a lower first sub-support portion SSP1-1 and a lower second sub-support portion SSP2-1, and an upper folding support portion FSP2 may be arranged between an upper first sub-support portion SSP1-2 and an upper second sub-support portion SSP2-2.

The folding support portions FSP1 and FSP2 may overlap the folding area FA1 (refer to FIG. 1A).

However, embodiments according to the present disclosure are not limited thereto or thereby. As an example, the body portion BD-1 may further include only the lower folding support portion FSP1 and may not include the upper folding support portion FSP2, or the body portion BD-1 may further include only the upper folding support portion FSP2 and may not include the lower folding support portion FSP1.

The folding support portions FSP1 and FSP2 may have thicknesses $T_5$ and $T_6$ smaller than thicknesses $T_1$, $T_2$, $T_3$, and $T_4$ of the first sub-support portion SSP1 and the second sub-support portion SSP2. As an example, the thicknesses $T_1$ and $T_3$ of the first sub-support portion SSP1 may be the same as the thicknesses $T_2$ and $T_4$ of the second sub-support portion SSP2, and the thicknesses $T_5$ and $T_6$ of the folding support portions FSP1 and FSP2 may be smaller than the thicknesses $T_1$ and $T_3$ of the first sub-support portion SSP1 and the thicknesses $T_2$ and $T_4$ of the second sub-support portion SSP2. That is, in a first support layer SL1-1 and a second support layer SL2-1 the thickness of the first portion PA1 may be smaller than the thickness of the second and third portions PA2 and PA3.

The body portion BD-1 may include the folding support portions FSP1 and FSP2 having the thicknesses $T_5$ and $T_6$ smaller than the thicknesses $T_1$ to $T_4$ of the first sub-support portion SSP1 and the second sub-support portion SSP2 in the first portion PA1. Thus, the repulsive force generated in the first portion PA1 of the body portion BD-1 during the folding operation of the display device may be reduced, and the flexibility of the display device may be improved.

The support module SM-1 shown in FIG. 10 includes the body portion BD-1 shown in FIG. 9.

Referring to FIG. 10, the support module SM-1 may further include filling members CM1 and CM2 respectively arranged on the folding support portions FSP1 and FSP2 between the first sub-support portion SSP1 and the second sub-support portion SSP2. That is, according to the support module SM-1, the folding support portions FSP1 and FSP2 may be arranged in openings OP1 and OP2 of a support layer SL-1, and the filling members CM1 and CM2 may be arranged on the folding support portions FSP1 and FSP2 in the openings OP1 and OP2, respectively.

Figure 11:
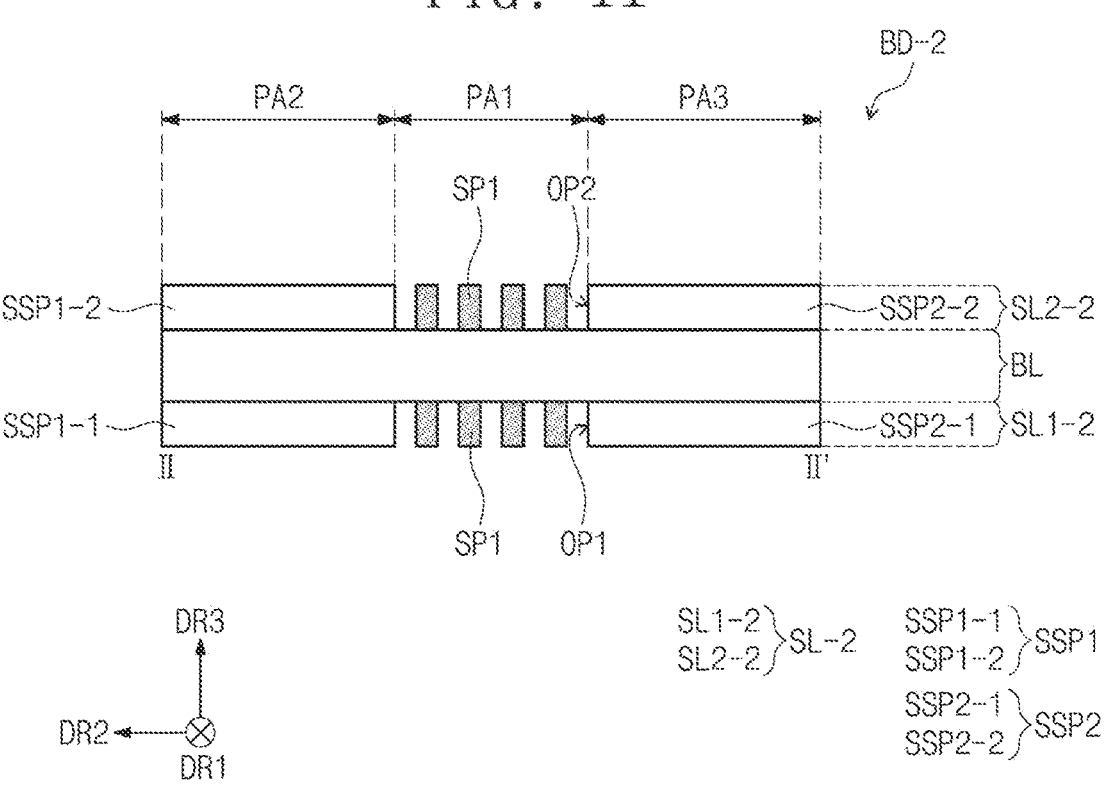
FIG. 11 is a cross-sectional view showing a body portion according to some embodiments of the present disclosure.
Figure 12:
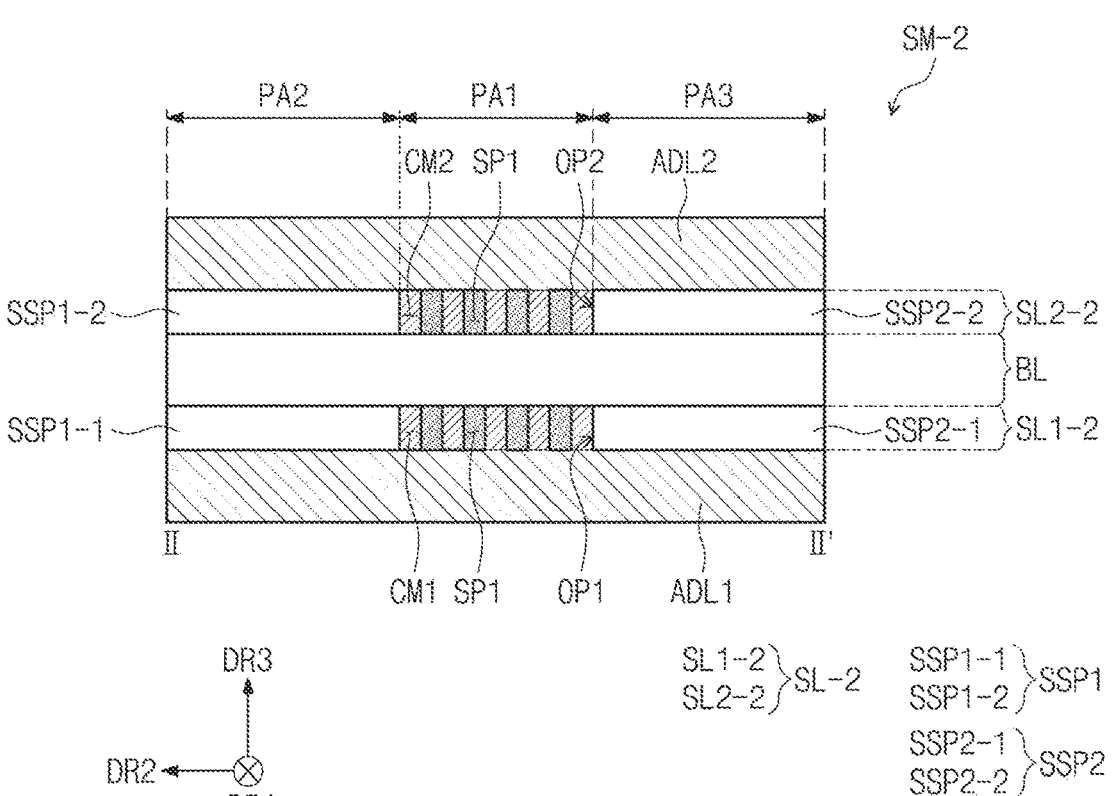
FIG. 12 is a cross-sectional view showing a support module according to some embodiments of the present disclosure.

A first filling member CM1 may be arranged on the lower folding support portion FSP1 in a first opening OP1. A second filling member CM2 may be arranged on the upper folding support portion FSP2 in a second opening OP2, FIG. 10 shows a structure in which the first sub-support portion SSP1, the second sub-support portion SSP2, and the folding portions FSP2 are formed separately from each other on the base layer BL and the first sub-support portion SSP1 the second sub-support portion SSP2, and the folding portions FSP1 are formed separately from each other under the base layer BL, however, the present disclosure should not be limited thereto or thereby. As an example, the first sub-support portion SSP1, the second sub-support portion SSP2, and the folding support portions FSP1 and FSP2 may be provided integrally with each other on and under the base layer BL. That is, the lower first sub-support portion SSP1-1, the lower second sub-support portion SSP2-1, and the lower folding support portion FSP1 may be provided integrally with each other under the base layer BL, and the upper first sub-support portion SSP1-2, the upper second sub-support portion SSP2-2, and the upper folding support portion FSP2 may be provided integrally with each other on the base layer BL. The first sub-support portion SSP1, the second sub-support portion SSP2, and the folding support portions FSP1 and FSP2 may be formed of the same material through the same single process, FIG. 11 is a cross-sectional view showing a body portion BD-2 according to some embodiments of the present disclosure. FIG. 12 is a cross-sectional view showing a support module SM-2 according to some embodiments of the present disclosure.

Referring to FIG. 11, a first opening OP1 may be defined through a first support layer SL1-2 of the body portion BD-2 to overlap the first portion PA1. A second opening OP2 may be defined through a second support layer SL2-2 of the body portion BD-2 to overlap the first portion PA1.

The body portion BD-2 may include a plurality of spacers SP1 overlapping the first and second openings OP1 and OP2 and spaced apart from each other. The spacers SP1 may support layers arranged adjacent to the body portion BD-2.

The spacers SP1 may be arranged in the first opening OP1 and the second opening OP2. For example, some of the spacers SP1 may be arranged between a lower first sub-support portion SSP1-1 and a lower second sub-support portion SSP2-1, and the other spacers SP1 may be arranged between an upper first sub-support portion SSP1-2 and an upper second sub-support portion SSP2-2. That is, the spacers SP1 may be arranged to overlap the folding area FA1 (refer to FIG. 1A).

As an example, the spacers SP1 may be spaced apart from each other in second direction DR2 in a plan view. Each of the spacers SP1 may extend in the first direction DR1 in a plan view.

As the spacers SP1 are spaced apart from each other, the flexibility of the body portion BD-2 may be improved during the folding operation of the display device ED.

FIG. 11 shows a structure in which the spacers SP1 are spaced apart from each other at regular intervals, however, the spacers SP1 should not be limited thereto or thereby.

In addition, FIG. 11 shows a structure in which the spacers SP1 have substantially the same thickness as a thickness of each of the lower and upper first sub-support portions SSP1-1 and SSP1-2 and a thickness of each of the lower and upper second sub-support portions SSP2-1 and SSP2-2, however, the present disclosure should not be limited thereto or thereby. As an example, the thickness of the spacers SP1 may be different from the thickness of the first sub-support portion SSP1 and the thickness of the second sub-support portion SSP2.

In addition, FIG. 11 shows a structure in which the spacers SP1 arranged in the first opening OP1 overlap the spacers SP1 arranged in the second opening OP2, however, embodiments according to the present disclosure are not limited thereto or thereby. As an example, the spacers SP1 arranged in the first opening OP1 may not overlap the spacers SP1 arranged in the second opening OP2.

The spacers SP1 may include the same material as that of the first sub-support portion SSP1 and the second sub-support portion SSP2. As an example, the spacers SP1 may include at least one of an acrylic resin, an epoxy resin, or a urethane resin, however, embodiments according to the present disclosure are not limited thereto or thereby. According to some embodiments, the spacers SP1 may include a material different from that of the first sub-support portion SSP1 and the second sub-support portion SSP2.

As described above, the body portion BD-2 may include the spacers SP1 spaced apart from each other in the first portion PA1, and thus, the repulsive force generated in the body portion BD-2 during the folding operation of the display device may be reduced, and the flexibility of the display device may be improved.

The support module SM-2 shown in FIG. 12 includes the body portion BD-2 shown in FIG. 11.

Referring to FIG. 12, the support module SM-2 may include filling members CM1 and CM2 respectively filled in the openings OP1 and OP2.

The filling members CM1 and CM2 may be filled between the first sub-support portion SSP1, the spacers SP1, and the second sub-support portion SSP2. The filling members CM1 and CM2 may provide flat surfaces for adhesive layers ADL1 and ADL2.

Due to the filling members CM1 and CM2, a first adhesive layer ADL1 may be arranged on the flat surface under the first support layer SL1-2, and a second adhesive layer ADL2 may be arranged on the flat surface on the second support layer SL2-2.

As described above, the support module SM-2 may include the spacers SP1 arranged to be spaced apart from each other in the folding area FA1 (refer to FIG. 1A), and thus, the impact resistance and the flexibility of the support module SM-2 may be improved.

Figure 13:
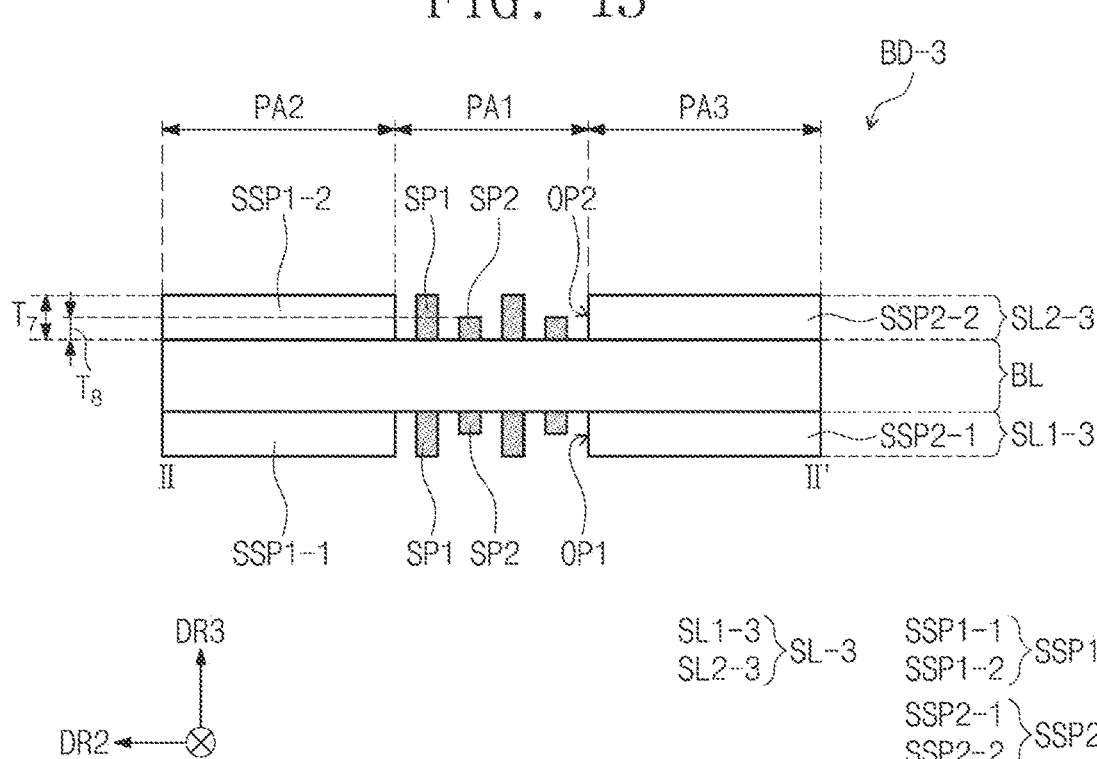
FIG. 13 is a cross-sectional view showing a body portion according to some embodiments of the present disclosure.
Figure 14:
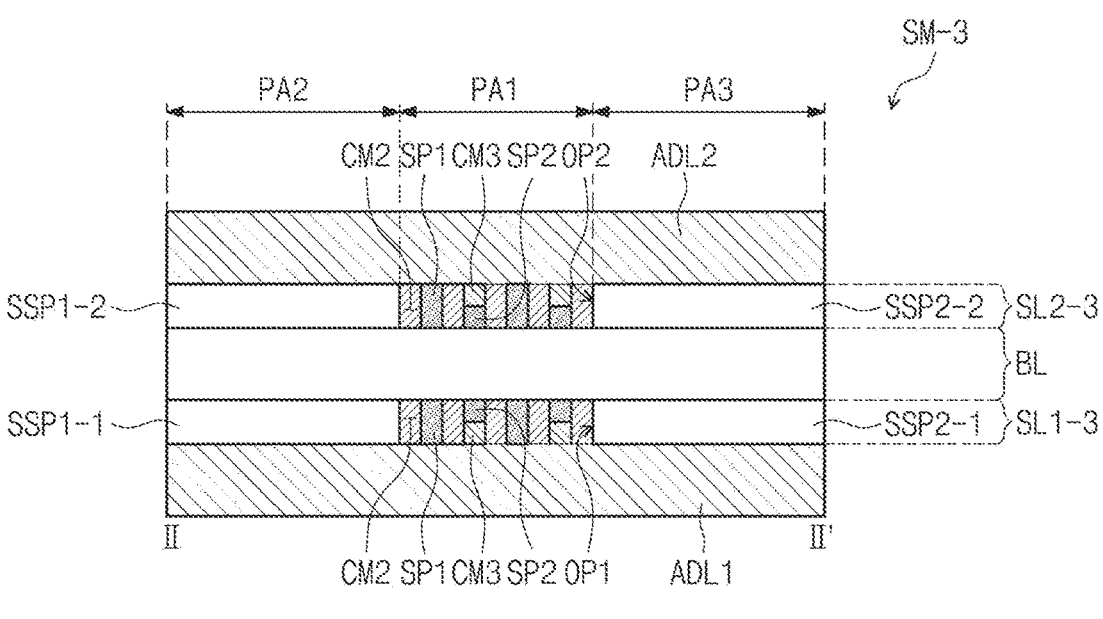
FIG. 14 is a cross-sectional view showing a support module according to some embodiments of the present disclosure.
Figure 14:
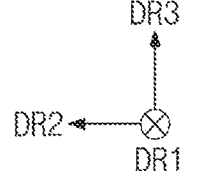

FIG. 13 is a cross-sectional view showing a body portion BD-3 according to some embodiments of the present disclosure. FIG. 14 is a cross-sectional view showing a support module SM-3 according to some embodiments of the present disclosure.

Referring to FIG. 13, the body portion BD-3 may include a plurality of spacers SP1 and SP2 arranged in openings OP1 and OP2 and spaced apart from each other.

Among the spacers SP1 and SP2, at least two spacers may have different thicknesses. As an example, the spacers SP1 and SP2 may include a first spacer SP1 having a first thickness $T_7$ and a second spacer SP2 having a second thickness $T_8$ smaller than the first thickness $T_7$. For example, the spacers SP1 and SP2 may include at least one first spacer SP1 and at least one second spacer SP2.

The first spacer SP1 and the second spacer SF2 may be spaced apart from each other, and as an example, FIGS. 13 and 14 show a structure in which the first spacer SP1 and the second spacer SP2 are alternately arranged one by one, however, the present disclosure should not be limited thereto or thereby. According to some embodiments, the first spacer SP1 and the second spacer SF2 may be arranged in various ways.

The first spacer SP1 and the second spacer SP2 may be arranged to overlap the folding area FA1 (refer to FIG. 1A), and thus, the impact resistance of a portion of the body portion BD-3 overlapping the folding area FA1 (refer to FIG. 1A) may be improved. In addition, the first spacer SP1 and the second spacer SP2 may be spaced apart from each other, and thus, the flexibility of the body portion BD-3 may be improved during the folding operation of the display device ED. In addition, the repulsive force of the body portion BD-3 may be reduced during the folding operation of the display device ED.

The support module SM-3 shown in FIG. 14 includes the body portion BD-3 shown in FIG. 13.

Referring to FIG. 14, the support module SM-3 may include filling members CM1, CM2, and CM3 filled in the openings OP1 and OP2.

As an example, a first filling member CM1 may be filled between a first support layer SL1-3, the first spacer SP1, and the second spacer SP2. For example, the first filling member CM1 may be filled between a lower first sub-support portion SSP1-1 the first spacer SP1, the second spacer SP2, and a lower second sub-support portion SSP2-1.

As an example, a second filling member CM2 may be filled between a second support layer SL2-3, the first spacer SP1, and the second spacer SP2. For example, the second filling member CM2 may be filled between an upper first sub-support portion SSP1-2, the first spacer SP1, the second spacer SP2, and an upper second sub-support portion SSP2-2.

As an example, a third filling member CM3 may compensate for the thickness of the second spacer SP2. For example, the third filling member CM3 may be arranged on the second spacer SP2 to overlap the second spacer SP2.

A sum of the thickness of the third filling member CM3 and the thickness of the second spacer SP2 may be the same as the thickness of the first spacer SP1.

The first filling member CM1 and the second filling member CM2 may include the same material as each other. As an example, the first filling member CM1 and the second filling member CM2 may include the same material as adhesive layers ADL1 and ADL2 and may include at least one of silicone, acrylate, or urethane. For example, the first filling member CM1, the second filling member CM2, and the adhesive layers ADL1 and ADL2 may include an optically clear adhesive (OCA), an optically clear resin (OCR), or a pressure sensitive adhesive (PSA).

The third filling member CM3 may include the same material as or may include a different material from the first filling member CM1 and the second filling member CM2. As an example, the third filling member CM3 may include at least one of silicon, acrylate, or urethane. For example, the third filling member CM3 may include a thermoplastic polyurethane (TPU).

As described above, the support module SM-3 may include the first, second, and third filling members CM1, CM2, and CM3 and may provide flat surfaces for the adhesive layers ADL1 and ALD2.

The support module SM-3 may include the first spacer SP1 and the second spacer SP2 having the thickness different from that of the first spacer SP1, and thus, flexibility and impact resistance of the support module SM-3 may be improved in an area overlapping the folding area FA1 (refer to FIG. 1A).

In addition, the support module SM-3 may include the first spacer SP1 and the second spacer SP2, and thus, the repulsive force generated in the support module SM-3 during the folding operation of the display device may be reduced.

Figure 15:
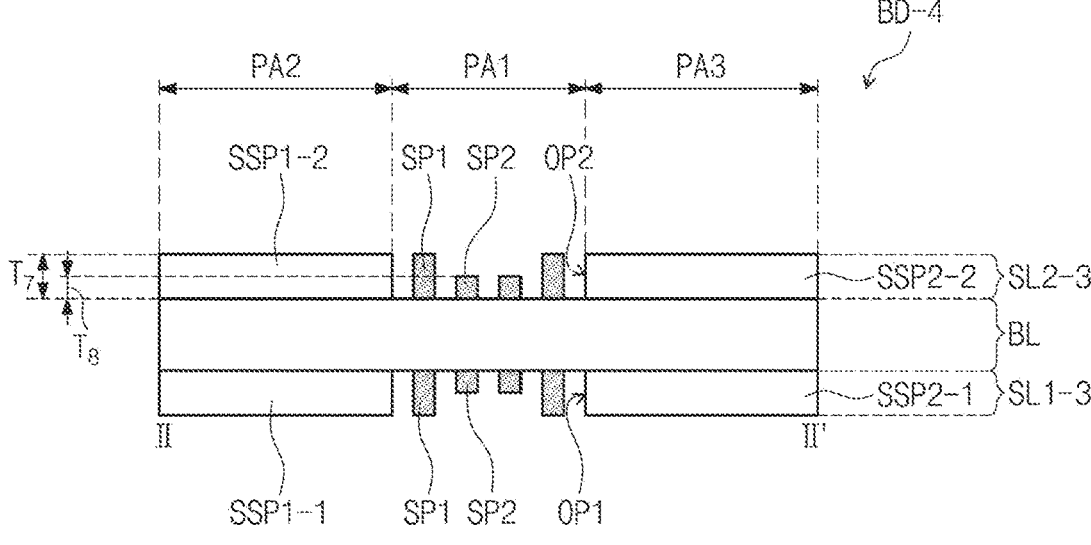
FIG. 15 is a cross-sectional view showing a body portion according to some embodiments of the present disclosure.
Figure 16:
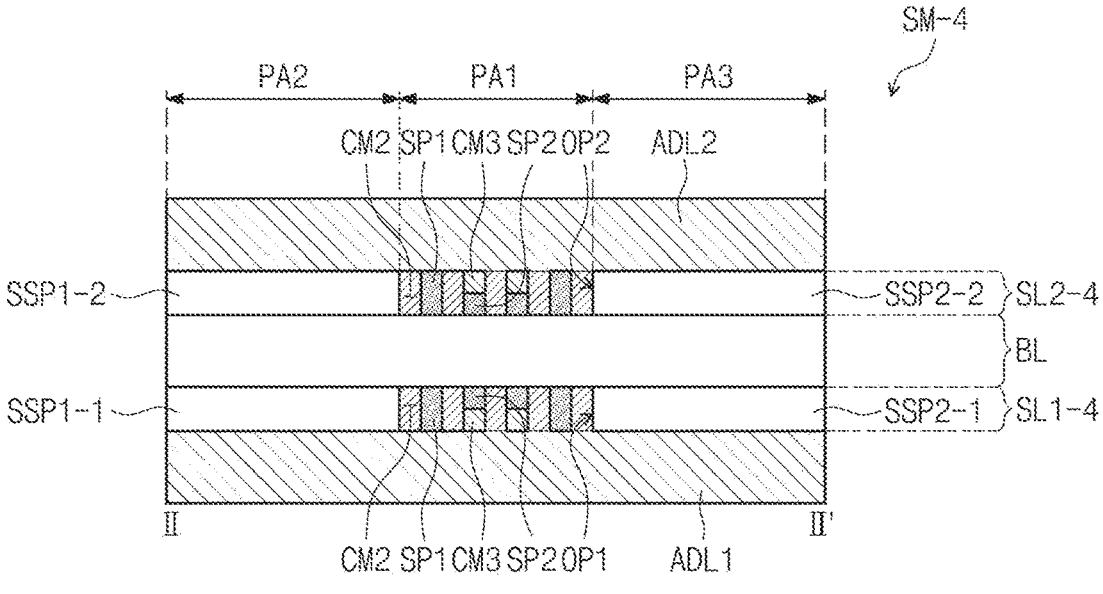
FIG. 16 is a cross-sectional view showing a support module according to some embodiments of the present disclosure.
Figure 16:
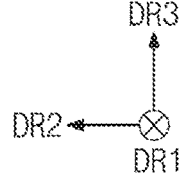

FIG. 15 is a cross-sectional view showing a body portion BD-4 according to some embodiments of the present disclosure. FIG. 16 is a cross-sectional view showing a support module SM-4 according to some embodiments of the present disclosure.

Referring to FIG. 15, the body portion BD-4 may include at least one first spacer SP1 and at least one second spacer SP2.

According to some embodiments, a spacer adjacent to the first spacer SP1 may be the first spacer SP1 or the second spacer SP2.

According to some embodiments, a spacer adjacent to the second spacer SP2 may be the first spacer SP1 or the second spacer SP2.

As an example, FIG. 15 shows a structure in which the spacers SP1 and SP2 are arranged in an order of the first spacer SP1, the second spacer SP2, the second spacer SP2, and the first spacer SP1 along the second direction DR2.

However, the arrangement of the first spacer SP1 and the second spacer SP2 should not be limited thereto or thereby.

Referring to FIG. 16, the support module SM-4 includes the body portion BD-4 shown in FIG. 15. Details of the support module described with reference to FIG. 14 may be applied to the support module SM-4 except the arrangement of the first spacer SP1 and the second spacer SP2.

Figure 17:
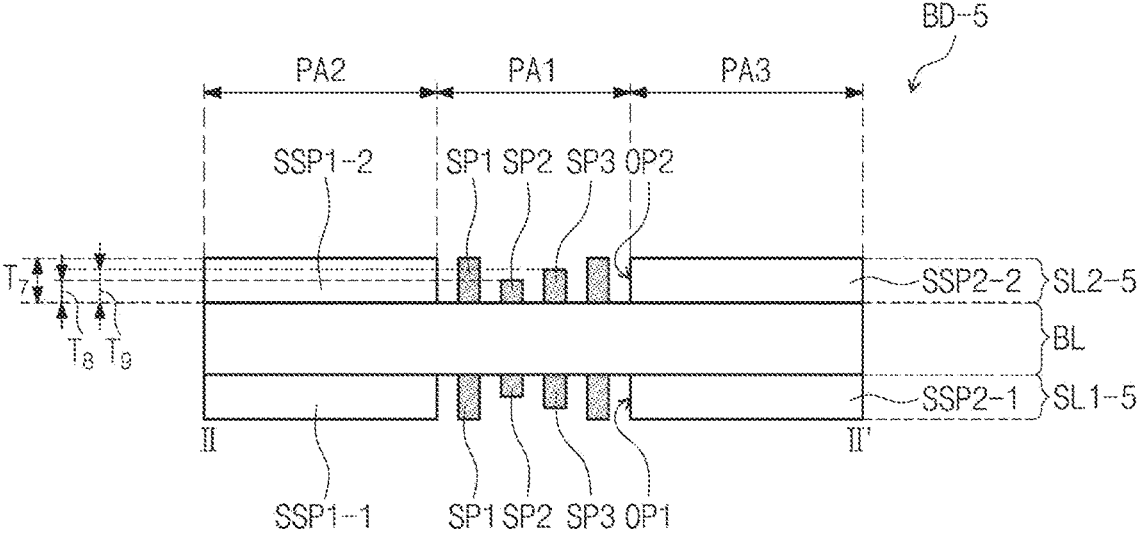
FIG. 17 is a cross-sectional view showing a body portion according to some embodiments of the present disclosure.
Figure 18:
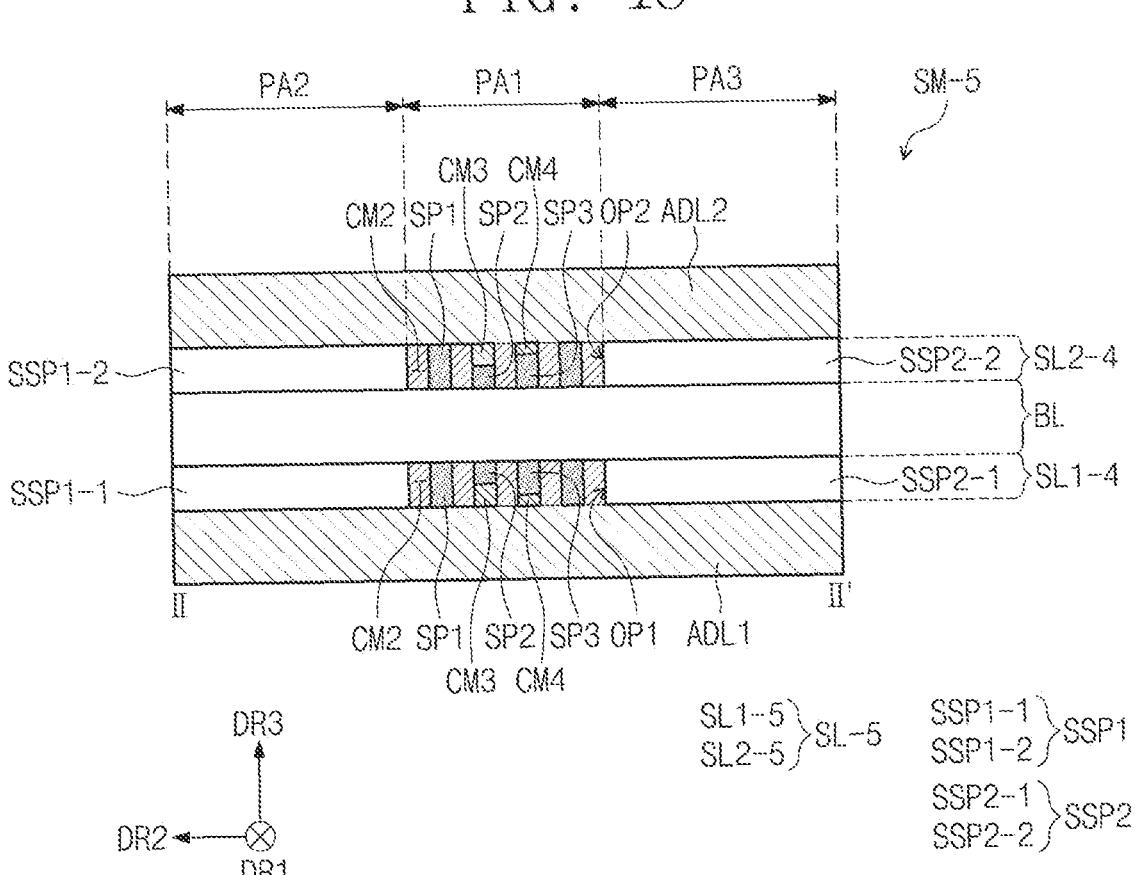
FIG. 18 is a cross-sectional view showing a support module according to some embodiments of the present disclosure.

FIG. 17 is a cross-sectional view showing a body portion BD-5 according to some embodiments of the present disclosure. FIG. 18 is a cross-sectional view showing a support module SM-5 according to some embodiments of the present disclosure.

Referring to FIG. 17, spacers SP1 SP2, and SP3 may include a first spacer SP1, a second spacer SP2, and a third spacer SP3, which have different thicknesses from each other. As an example, the first spacer SP1 may have a first thickness $T_7$, the second spacer SP2 may have a second thickness TB smaller than the first thickness $T_7$, and the third spacer SP3 may have a third thickness $T_9$ smaller than the first thickness $T_7$. The third thickness $T_9$ may be smaller than the first thickness $T_7$ and may be greater than the second thickness TB.

As described above, the body portion BD-5 may include the first spacer SP1, the second spacer SP2, and the third spacer SP3, and thus, the flexibility of the body portion BD-5 may be improved in the folding area FA1 (refer to FIG. 1A). In addition, the repulsive force generated in the body portion BD-5 overlapping the folding area FA1 (refer to FIG. 1A) during the folding operation of the display device ED may be reduced.

Referring to FIG. 18, the support module SM-5 may include the body portion BD-5 shown in FIG. 17.

The support module SM-5 may include first, second, third, and fourth filling members CM1, CM2, CM3, and CM4 filled in openings OP1 and OP2.

The fourth filling member CM4 may be arranged on the third spacer SP3 and may overlap the third spacer SP3. The fourth filling member CM4 may compensate for a thickness of the third spacer SP3. For example, a sum of a thickness of the fourth filling member CM4 and the thickness of the third spacer SP3 may be the same as the thickness of the first spacer SP1.

The fourth filling member CM4 may include the same material as that of the third filling member CM3. As an example, the fourth filling member CM4 may include at least one of silicone, acrylate, or urethane, and for example, the fourth filling member CM4 may include a thermoplastic polyurethane (TPU).

The support module SM-5 may include the first, second, third, and fourth filling members CM1, CM2, CM3, and CM4 and may provide flat surfaces for adhesive layers ADL1 and ALD2.

Details of the other components described with reference to FIGS. 1A to 17 may also be applied to those shown in FIG. 18.

The support module SM-5 may include the first spacer SP1, the second spacer SP2, and the third spacer SP3, which have different thicknesses from each other, and thus, the flexibility and the impact resistance of the support module SM-5 may be improved in an area overlapping the folding area FA1 (refer to FIG. 1A). In addition, the support module SM-5 may include the first spacer SP1, the second spacer SP2, and the third spacer SP3, which have different thicknesses from each other, and thus, the repulsive force generated in the support module SM-5 may be reduced during the folding operation of the display device.

As described above, the display device may include the support module, and the support module may include the base layer including the base fiber, the support layer arranged on at least one of the upper or lower portions of the base layer and provided with the opening overlapping the folding area, and the spacers located in the openings and having different thicknesses from each other. Thus, the impact resistance and the folding characteristics of the display device may be relatively improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims, and their equivalents.

What is claimed is:

1. A display device comprising:
   a display module comprising a first non-folding area, a second non-folding area, and a folding area between the first non-folding area and the second non-folding area; and
   a support module under the display module to support the display module, the support module comprising:
   a base layer comprising at least one of a glass fiber, a carbon fiber, or an aramid fiber;
   a support layer having an opening therethrough, the opening overlapping the folding area, wherein the support layer is on at least one of upper or lower portions of the base layer; and
   a first filling member, different from the base layer, filling the opening through the support layer such that the first filling member extends across internal edges of the opening.

2. The display device of claim 1, wherein the support layer comprises a resin.

3. The display device of claim 2, wherein the resin comprises at least one of an acrylic resin, an epoxy resin, or a urethane resin.

4. The display device of claim 1, wherein the support module further comprises a plurality of spacers in the opening and spaced apart from each other.

5. The display device of claim 4, wherein the spacers comprise a first spacer having a first thickness and a second spacer having a second thickness smaller than the first thickness.

6. The display device of claim 5, wherein the first spacer is alternately arranged with the second spacer.

7. The display device of claim 5, wherein the support layer comprises a first support layer on the base layer and a second support layer under the base layer.

8. The display device of claim 7, wherein the support module comprises the first filling member filled between at least two of the first support layer, the first spacer, and the second spacer.

9. The display device of claim 8, wherein the support module comprises a second filling member filled between at least two of the second support layer, the first spacer, and the second spacer.

10. The display device of claim 9, wherein the support module comprises a third filling member overlapping the second spacer and on the second spacer, and a sum of a thickness of the third filling member and a thickness of the second spacer is equal to a thickness of the first spacer.

11. The display device of claim 10, wherein the first filling member comprises a same material as a material of the second filling member, and the third filling member comprises a material different from the material of the first filling member.

12. The display device of claim 10, wherein the first filling member, the second filling member, and the third filling member comprise a same material as each other.

13. The display device of claim 10, wherein the third filling member comprises a thermoplastic polyurethane.

14. The display device of claim 9, wherein the support module further comprises an adhesive layer on one surface of the support layer.

15. The display device of claim 14, wherein the first filling member, the second filling member, and the adhesive layer comprise a same material as each other.

16. The display device of claim 1, wherein the support layer comprises a first sub-support portion overlapping the first non-folding area and a second sub-support portion overlapping the second non-folding area.

17. The display device of claim 16, wherein the first sub-support portion comprises a lower first sub-support portion under the base layer and an upper first sub-support portion on the base layer, and the second sub-support portion comprises a lower second sub-support portion under the base layer and an upper second sub-support portion on the base layer.

18. The display device of claim 17, wherein the support module comprises a plurality of spacers under the base layer and between the lower first sub-support portion and the lower second sub-support portion.

19. The display device of claim 17, wherein the support module comprises a plurality of spacers on the base layer and between the upper first sub-support portion and the upper second sub-support portion.

20. The display device of claim 17, wherein the support module further comprises a filling material located at at least one of between the lower first sub-support portion and the lower second sub-support portion or between the upper first sub-support portion and the upper second sub-support portion.

* * * * *